(12) United States Patent
Dai et al.

(10) Patent No.: US 12,739,529 B2
(45) Date of Patent: Sep. 15, 2026

(54) HYBRID IMAGE SENSORS WITH ON-CHIP IMAGE DEBLUR AND ROLLING SHUTTER DISTORTION CORRECTION

(71) Applicant: OMNIVISION TECHNOLOGIES, INC., Santa Clara, CA (US)

(72) Inventors: Tiejun Dai, Santa Clara, CA (US); Bo Mu, San Jose, CA (US); Menghan Guo, Shanghai (CN); Wenlei Yang, Shanghai (CN); Qinyi Wang, West Coast Vale (SG); Andreas Suess, San Jose, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 50 days.

(21) Appl. No.: 18/938,184

(22) Filed: Nov. 5, 2024

(65) Prior Publication Data

US 2025/0159370 A1 May 15, 2025

Related U.S. Application Data

(60) Provisional application No. 63/597,638, filed on Nov. 9, 2023.

(51) Int. Cl.
*H04N 25/47* (2023.01)
*H04N 23/45* (2023.01)
(Continued)

(52) U.S. Cl.
CPC ......... *H04N 25/47* (2023.01); *H04N 23/6811* (2023.01); *H04N 23/683* (2023.01);
(Continued)

(58) Field of Classification Search
CPC ...... H04N 23/45; H04N 23/68; H04N 23/681; H04N 23/6811; H04N 23/683;
(Continued)

(56) References Cited

U.S. PATENT DOCUMENTS 11,288,818 B2 3/2022 Daniilidis et al.
11,785,200 B1 10/2023 Smits et al.
(Continued)

OTHER PUBLICATIONS

Pan, et al., "Bringing a Blurry Frame Alive at High Frame-Rate with an Event Camera", retrieved from: https://openaccess.thecvf.com/content_CVPR_2019/papers/Pan_Bringing_a_Blurry_Frame_Alive_at_High_Frame-Rate_With_an_CVPR_2019_paper.pdf, 2019, 6820-6829.

(Continued)

*Primary Examiner* — Lin Ye
*Assistant Examiner* — Chriss S Yoder, III
(74) *Attorney, Agent, or Firm* — Dorsey & Whitney LLP

(57) ABSTRACT

Hybrid image sensors with on-chip image deblur and rolling shutter distortion correction (and associated systems, devices, and methods) are disclosed herein. In one embodiment, an image sensor includes (a) an event driven sensing array including one or more event vision sensor (EVS) pixels, each configured to capture event data corresponding to contrast information of light incident on the EVS pixel; (b) a pixel array including a plurality of CMOS image sensor (CIS) pixels arranged in one or more CIS pixel rows, each CIS pixel configured to capture CIS data corresponding to intensity of light incident on the CIS pixel, and (c) a rolling shutter distortion correction circuit configured to correct the CIS data for rolling shutter distortion using the event data.

39 Claims, 14 Drawing Sheets

(51) Int. Cl.

| | |
|---|---|
| ***H04N 23/68*** | (2023.01) |
| ***H04N 23/81*** | (2023.01) |
| ***H04N 23/84*** | (2023.01) |
| ***H04N 25/42*** | (2023.01) |
| ***H04N 25/46*** | (2023.01) |
| ***H04N 25/53*** | (2023.01) |
| ***H04N 25/531*** | (2023.01) |
| ***H04N 25/616*** | (2023.01) |
| ***H04N 25/62*** | (2023.01) |
| ***H04N 25/707*** | (2023.01) |
| ***H04N 25/76*** | (2023.01) |
| ***H04N 25/766*** | (2023.01) |
| ***H04N 25/767*** | (2023.01) |
| ***H04N 25/78*** | (2023.01) |
| ***H04N 25/79*** | (2023.01) |

(52) U.S. Cl.
CPC ........... *H04N 23/81* (2023.01); *H04N 23/843* (2023.01); *H04N 25/42* (2023.01); *H04N 25/46* (2023.01); *H04N 25/53* (2023.01); *H04N 25/616* (2023.01); *H04N 25/62* (2023.01); *H04N 25/707* (2023.01); *H04N 25/76* (2023.01); *H04N 25/766* (2023.01); *H04N 25/767* (2023.01); *H04N 25/78* (2023.01); *H04N 25/79* (2023.01); *H04N 23/45* (2023.01); *H04N 25/531* (2023.01)

(58) Field of Classification Search
CPC ...... H04N 23/81; H04N 23/843; H04N 25/42; H04N 25/46; H04N 25/47; H04N 25/53; H04N 25/531; H04N 25/616; H04N 25/62; H04N 25/707; H04N 25/76; H04N 25/766; H04N 25/767; H04N 25/78; H04N 25/79
See application file for complete search history.

(56) References Cited

U.S. PATENT DOCUMENTS

| | | | | |
|---|---|---|---|---|
| 2013/0058587 | A1 | 3/2013 | Wang et al. | |
| 2015/0146037 | A1 | 5/2015 | Keelan | |
| 2017/0187961 | A1* | 6/2017 | Katz | H04N 23/6812 |
| 2018/0189937 | A1 | 7/2018 | Bala et al. | |
| 2020/0389582 | A1 | 12/2020 | Herman | |
| 2021/0174092 | A1 | 6/2021 | Zhao et al. | |
| 2021/0344867 | A1 | 11/2021 | Gao et al. | |
| 2022/0284593 | A1 | 9/2022 | Naganuma et al. | |
| 2022/0329771 | A1 | 10/2022 | Perrone et al. | |
| 2023/0030562 | A1 | 2/2023 | Seo et al. | |
| 2023/0042364 | A1 | 2/2023 | Ye et al. | |
| 2023/0230212 | A1* | 7/2023 | García Capel | G06T 5/92 382/100 |
| 2023/0254579 | A1* | 8/2023 | Perrone | G06T 5/73 348/208.6 |
| 2024/0169492 | A1 | 5/2024 | Ollila et al. | |
| 2024/0236517 | A1 | 7/2024 | Kim et al. | |
| 2025/0159367 | A1 | 5/2025 | Dai et al. | |
| 2025/0159371 | A1 | 5/2025 | Dai et al. | |
| 2025/0159375 | A1 | 5/2025 | Dai et al. | |
| 2025/0159376 | A1 | 5/2025 | Dai et al. | |
| 2025/0240538 | A1 | 7/2025 | Liu et al. | |
| 2025/0373939 | A1 | 12/2025 | Miyatani et al. | |
| 2025/0386115 | A1 | 12/2025 | Kim et al. | |

OTHER PUBLICATIONS

Notice of Allowance received in U.S. Appl. No. 18/938,080 dated Feb. 18, 2026, pp all,.
Non-Final office action received in U.S. Appl. No. 18/938,125 dated Feb. 27, 2026, pp all.
Notice of Allowance received in U.S. Appl. No. 18/937,933 dated Mar. 17, 2026, pp all.
United States Non-Final Office Action received in U.S. Appl. No. 18/938,080 dated Apr. 15, 2026, pp all.
U.S. Non-Final Office Action received in U.S. Appl. No. 18/938,208 dated May 8, 2026, pp all.

* cited by examiner

HYBRID IMAGE SENSORS WITH ON-CHIP IMAGE DEBLUR AND ROLLING SHUTTER DISTORTION CORRECTION

CROSS-REFERENCE TO RELATED APPLICATION(S)

The present application claims the benefit of U.S. Provisional Patent Application No. 63/597,638, filed Nov. 9, 2023, which is incorporated by reference herein in its entirety.

This application contains subject matter related to cofiled, copending, and coassigned U.S. patent application Ser. No. 18/938,208, filed Nov. 5, 2024, and titled "HYBRID IMAGE SENSORS WITH ON-CHIP IMAGE DEBLUR," which is incorporated herein by reference in its entirety.

This application contains subject matter related to cofiled, copending, and coassigned U.S. patent application Ser. No. 18/938,125, filed Nov. 5, 2024, and titled "METHODS FOR OPERATING HYBRID IMAGE SENSORS HAVING DIFFERENT CIS-TO-EVS RESOLUTIONS," which is incorporated herein by reference in its entirety.

This application contains subject matter related to cofiled, copending, and coassigned U.S. patent application Ser. No. 18/938,080, filed Nov. 5, 2024, and titled "HYBRID IMAGE SENSORS WITH VIDEO FRAME INTERPOLATION," which is incorporated herein by reference in its entirety.

This application contains subject matter related to cofiled, copending, and coassigned U.S. patent application Ser. No. 18/937,933, filed Nov. 5, 2024, and titled "HYBRID IMAGE SENSORS WITH ADJUSTABLE CONTRAST THRESHOLDS," which is incorporated herein by reference in its entirety.

TECHNICAL FIELD

This disclosure relates generally to image sensors. For example, several embodiments of the present technology relate to hybrid image sensors that utilize event-based vision sensor (EVS) data to deblur and correct for rolling-shutter distortion in complementary metal oxide semiconductor (CMOS) image sensor (CIS) data on-chip before outputting deblurred and rolling-shutter-corrected image frames (e.g., to downstream components of a corresponding imaging system).

BACKGROUND

Image sensors have become ubiquitous and are now widely used in digital cameras, cellular phones, security cameras, as well as medical, automobile, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to provide information that is representative of the external scene.

BRIEF DESCRIPTION OF THE DRAWINGS

Non-limiting and non-exhaustive embodiments of the present technology are described below with reference to the following figures, in which like or similar reference numbers are used to refer to like or similar components throughout unless otherwise specified.

Figure 1:
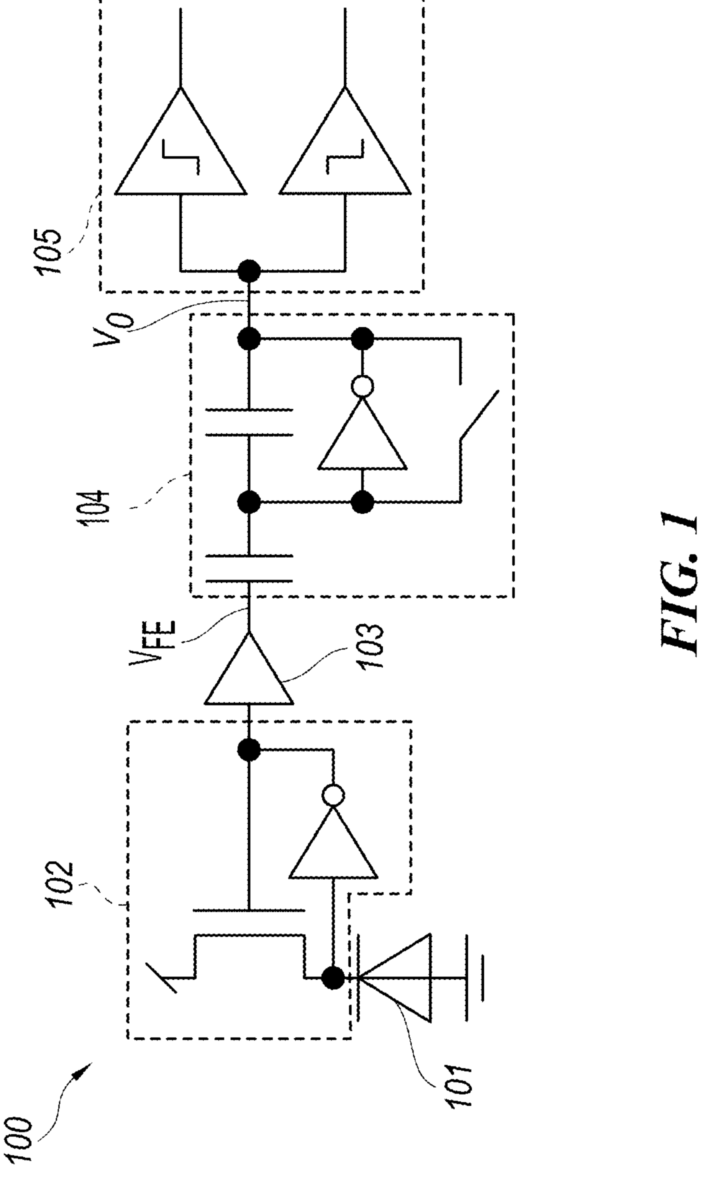
FIG. 1 is a partially schematic diagram of an EVS pixel configured in accordance with various embodiments of the present technology.

Skilled artisans will appreciate that elements in the figures are illustrated for simplicity and clarity and are not necessarily drawn to scale. For example, the dimensions of some of the elements in the figures may be exaggerated relative to other elements to aid in understanding of various aspects of the present technology. In addition, common but well-understood elements or methods that are useful or necessary in a commercially feasible embodiment are often not depicted in the figures, or described in detail below, to avoid unnecessarily obscuring the description of various aspects of the present technology.

DETAILED DESCRIPTION

The present disclosure relates to hybrid image sensors with on-chip image capabilities, such as on-chip, event-guided deblur capabilities with rolling shutter distortion correction. For example, several embodiments of the present technology described in detail below are directed to image sensors that (a) synchronize CIS data captured by CIS pixels with corresponding EVS/event data captured by one or more EVS pixels, (b) accumulate event data over an event accumulation period aligned with an exposure period of the CIS pixels, and (c) deblur the CIS data using the accumulated event data to generate deblurred image/video data that is corrected for rolling-shutter distortion and that can then be output from the image sensors. In the following description, specific details are set forth to provide a thorough understanding of aspects of the present technology. One skilled in the relevant art will recognize, however, that the systems, devices, and techniques described herein can be practiced without one or more of the specific details set forth herein, or with other methods, components, materials, etc.

Reference throughout this specification to an "example" or an "embodiment" means that a particular feature, structure, or characteristic described in connection with the example or embodiment is included in at least one example or embodiment of the present technology. Thus, use of the phrases "for example," "as an example," or "an embodiment" herein are not necessarily all referring to the same example or embodiment and are not necessarily limited to the specific example or embodiment discussed. Furthermore, features, structures, or characteristics of the present technology described herein may be combined in any suitable manner to provide further examples or embodiments of the present technology.

Spatially relative terms (e.g., "beneath," "below," "over," "under," "above," "upper," "top," "bottom," "left," "right," "center," "middle," and the like) may be used herein for ease of description to describe one element's or feature's relationship relative to one or more other elements or features as illustrated in the figures. It will be understood that the spatially relative terms are intended to encompass different orientations of a device or system in use or operation, in addition to the orientation depicted in the figures. For example, if a device or system illustrated in the figures is rotated, turned, or flipped about a horizontal axis, elements or features described as "below" or "beneath" or "under" one or more other elements or features may then be oriented "above" the one or more other elements or features. Thus, the exemplary terms "below" and "under" are non-limiting and can encompass both an orientation of above and below. The device or system may additionally, or alternatively, be otherwise oriented (e.g., rotated ninety degrees about a vertical axis, or at other orientations) than illustrated in the figures, and the spatially relative descriptors used herein are interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

A. Overview

An active pixel sensor employs an array of pixels that are used to capture intensity images/video of an external scene. More specifically, the pixels are used to obtain CIS information (e.g., intensity information) corresponding to light from the external scene that is incident on the pixels. CIS information obtained during an integration period is read out at the end of the integration period and used to generate a corresponding intensity image of the external scene.

The pixels of an active pixel sensor typically have an integration time that is globally defined. Thus, pixels in an array of an active pixel sensor typically have an identical integration time, and each pixel in the array is typically converted into a digital signal regardless of its content (e.g., regardless of whether there has been a change in an external scene that was captured by a pixel since the last time the pixel was read out). As such, a relatively large amount of memory and power can be required to operate an active pixel sensor at high frame rates. Thus, due in part to memory and power constraints, it is difficult to use an active pixel sensor on its own to obtain intensity images/video of an external scene at ultra-high frame rates.

Moreover, when motion or other changes occur in an external scene during an integration period, motion artifacts can be observed as blurring in the resulting intensity image of the external scene. Blurring can be especially prominent in low light conditions in which longer exposure times are used. As such, active pixel image sensors on their own are not great at obtaining sharp intensity images/video of highly dynamic scenes.

In comparison, event vision sensors (e.g., event driven sensors or dynamic vision sensors) employ EVS pixels that are usable to obtain non-CIS information (e.g., contrast information, intensity changes, event data) corresponding to light from an external scene that is incident on those EVS pixels. Event vision sensors read out an EVS pixel and/or convert a corresponding pixel signal into a digital signal only when the EVS pixel detects a change (e.g., an event) in the external scene. In other words, EVS pixels of an event vision sensor that do not detect a change in the external scene are not read out and/or pixel signals corresponding to such EVS pixels are not converted into digital signals (thereby saving power). Thus, each EVS pixel of an event vision sensor can be independent from other EVS pixels of the event vision sensor, and only EVS pixels that detect a change in the external scene need be read out and/or have their corresponding pixel signals converted into digital signals. As a result, unlike active pixel sensors with synchronous integration times, event vision sensors do not suffer from limited dynamic ranges and are able to accurately capture high-speed motion. Thus, event visions sensors are often more robust than active pixel sensors in low lighting conditions and/or in highly dynamic scenes because they are not affected by under/over exposure or motion blur associated with a synchronous shutter. Stated another way, event vision sensors can be used to provide ultra-high frame rates and to accurately capture high-speed motions.

Hybrid image sensors employ an array of pixels that includes a combination of (i) active (CIS) pixels usable to obtain CIS information corresponding to light from an external scene and (ii) EVS pixels usable to obtain non-CIS information corresponding to light from the external scene. Such hybrid image sensors are therefore able to simultaneously capture (a) intensity images/video of an external scene and (b) events occurring within the external scene. Event data captured by the EVS pixels can be used to resolve/mitigate (i) the low frame-rate intensity image problem discussed above and (ii) the blurry effect inherent in intensity images captured using CIS pixels in the presence of motion. For example, using an event-based double integral (EDI) model, high frame-rate intensity images/video of an external scene can be reconstructed from a single (e.g., blurry) intensity image and its event sequence.

A description of the EDI model is provided here for the sake of clarity and understanding. Instantaneous intensity (or irradiance/flux) at a pixel (x, y) at any time t, related to the rate of photon arrival at that pixel (x, y), is known as a latent image $L_{xy}(t)$. The latent image $L_{xy}(t)$ is not directly output from a hybrid image sensor corresponding to the pixel (x, y). Instead, the hybrid image sensor outputs (i) an intensity image (e.g., a blurry image) that represents a combination of multiple latent images (including the latent image $L_{xy}(t)$) captured by one or more CIS pixels over an exposure period, and (ii) a sequence of events captured during the exposure period that record changes in intensity between the latent images. A description of how events can be detected is provided below, followed by a description of how detected events may be used to obtain the latent image $L_{xy}(t)$ for a pixel. Because each pixel of an image sensor can be treated separately, the subscripts x, y are omitted from the equations and variables that follow for readability. One should appreciate, however, that the latent image $L_{xy}(t)$ for a pixel of a pixel array at a given time represents a portion of a latent image $L_F(t)$ for the full pixel array at that given time. Thus, the latent image $L_F(t)$ for the full pixel array at the given time can be obtained by determining the latent image $L_{xy}(t)$ of every pixel in the array at that given time.

FIG. 1 is a partially schematic diagram of an EVS pixel 100 configured in accordance with various embodiments of the present technology. The EVS pixel 100 is also referred to herein as an "event sensing front-end circuit." As shown, the EVS pixel 100 includes a photosensor 101, a logarithmic amplifier 102, a buffer 103, a difference detector 104, and up/down comparators 105.

The photosensor 101 is configured to photogenerate image charge (photocurrent) in response to incident light. Photocurrent photogenerated by the photosensor 101 at time t is directly proportional to the latent image L(t) (e.g., irradiance of the incident light) at time t, as indicated by Equation 1 below:

$$I_{photo}(t) \propto L(t) \quad \text{Equation 1}$$

As discussed above, the latent image L(t) denotes the instantaneous intensity at the EVS pixel 100 at time t, related to the rate of photon arrival at the EVS pixel 100.

Photocurrent photogenerated by the photosensor 101 is fed into the logarithmic amplifier 102. In turn, the logarithmic amplifier 102 transduces (a) the photocurrent that is linearly proportional to the latent image L(t) into (b) a voltage $V_{FE}$ that is logarithmically dependent on the latent image L(t), as indicated by Equation 2 below:

$$V_{FE} \propto \ln[I_{photo}(t)] \propto \ln[L(t)] \quad \text{Equation 2}$$

Temporal contrast (also referred to herein as "linear contrast") is defined as a change in light contrast on the EVS pixel 100 (e.g., on the photosensor 101) relative to a reference time $t_0$, and is provided by Equation 3 below:

$$C_{lin} = \frac{L(t) - L(t_0)}{L(t_0)} = \frac{L(t)}{L(t_0)} - 1 \quad \text{Equation 3}$$

The difference detector 104 of the EVS pixel 100 is used to monitor temporal contrast of light incident on the photosensor 101. More specifically, when reset, the difference detector 104 samples the voltage $V_{FE}$ at a reference time $t_0$ and thereafter generates an output $V_O$ shown by Equation 4 below:

$$V_O = \alpha + \beta \cdot \ln\left(\frac{I_{photo}(t)}{I_{photo}(t_0)}\right) \quad \text{Equation 4}$$

The output $V_O$ of the difference detector 104 tracks a change of the voltage $V_{FE}$ over time relative to the voltage $V_{FE}$ at the reference time $t_0$. As shown by Equation 5 below, as the voltage $V_{FE}$ changes over time, the corresponding change in the output $V_O$ of the difference detector 104 is proportional to the log of the temporal contrast:

$$\Delta V_O = \beta \cdot \ln\left(\frac{L(t)}{L(t_0)}\right) = \beta \cdot \ln(1 + C_{lin}) = \beta \cdot C_{log} \quad \text{Equation 5}$$

The output $V_O$ of the difference detector 104 is fed into the up/down comparators 105. In turn, the up/down comparators 105 compare the output $V_O$ to corresponding threshold voltages $V_{+TH}$ and $V_{-TH}$ that are given by Equation 6 below in which $C_{log-TH}$ is a contrast threshold parameter determining whether an event should be recorded. As shown by Equation 7 below, the up comparator detects an event when the output $V_O$ of the difference detector 104 exceeds the threshold voltage $V_{+TH}$. As shown by Equation 8 below, the down comparator detects an event when the output $\Delta V_O$ of the difference detector 104 is less than the threshold voltage $V_{-TH}$.

$$V_{\pm TH} = \pm \beta \cdot C_{log-TH} \quad \text{Equation 6}$$

$$\Delta V_O \geq V_{+TH} \Rightarrow \text{event} \Rightarrow \ln\left(\frac{L(t)}{L(t_0)}\right) \geq C_{log-TH} \quad \text{Equation 7}$$

$$\Delta V_O \leq V_{-TH} \Rightarrow \text{event} \Rightarrow \ln\left(\frac{L(t)}{L(t_0)}\right) \leq C_{log-TH} \quad \text{Equation 8}$$

Using the log ratio rule, Equations 7 and 8 provide Equations 9 and 10, respectively, that specify when an event is detected by the EVS pixel 100:

$$\ln[L(t_i)] \geq \ln[L(t_{i-1})] + C_{log-TH} \qquad \text{Equation 9}$$

$$\ln[L(t_i)] \leq \ln[L(t_{i-1})] - C_{log-TH} \qquad \text{Equation 10}$$

Time $t_i$ in the above equations corresponds to each time an event is detected, and time $t_{i-1}$ denotes the timestamp of the previous event. When an event is triggered in an EVS pixel, $L(t_{i-1})$ is updated to a new intensity level (e.g., by resetting the difference detector 104 such that the difference detector 104 newly samples the voltage $V_{FE}$). Detection of an event at time $t_i$ therefore indicates that a change in log intensity exceeding the contrast threshold parameter $C_{log-TH}$ has occurred relative to the previous event detected at time $t_{i-1}$. In other words, each detected event indicates intensity changes between latent images (a current latent image $L(t_i)$ and a previous latent image $L(t_{i-1})$). Therefore, Equations 9 and 10 above provide Equation 11 below in which c is equivalent to $C_{log-TH}$ and $p_i$ is event polarity:

$$\ln[L(t_i)] = \ln[L(t_{i-1})] + c \cdot p_i \qquad \text{Equation 11}$$

Event polarity $p_i$ at each time $t_i$ is given by Equation 12 below. A polarity $p_i$ of +1 denotes an increase in irradiance of light incident on the photosensor 101, and a polarity $p_i$ of −1 denotes a decrease in irradiance of light incident on the photosensor 101.

$$p_i = \begin{Bmatrix} +1 \text{ if } \ln\left(\frac{L(t_i)}{L(t_{i-1})}\right) \geq C_{log-TH} \\ -1 \text{ if } \ln\left(\frac{L(t_i)}{L(t_{i-1})}\right) \leq C_{log-TH} \end{Bmatrix} \qquad \text{Equation 12}$$

Figure 2:
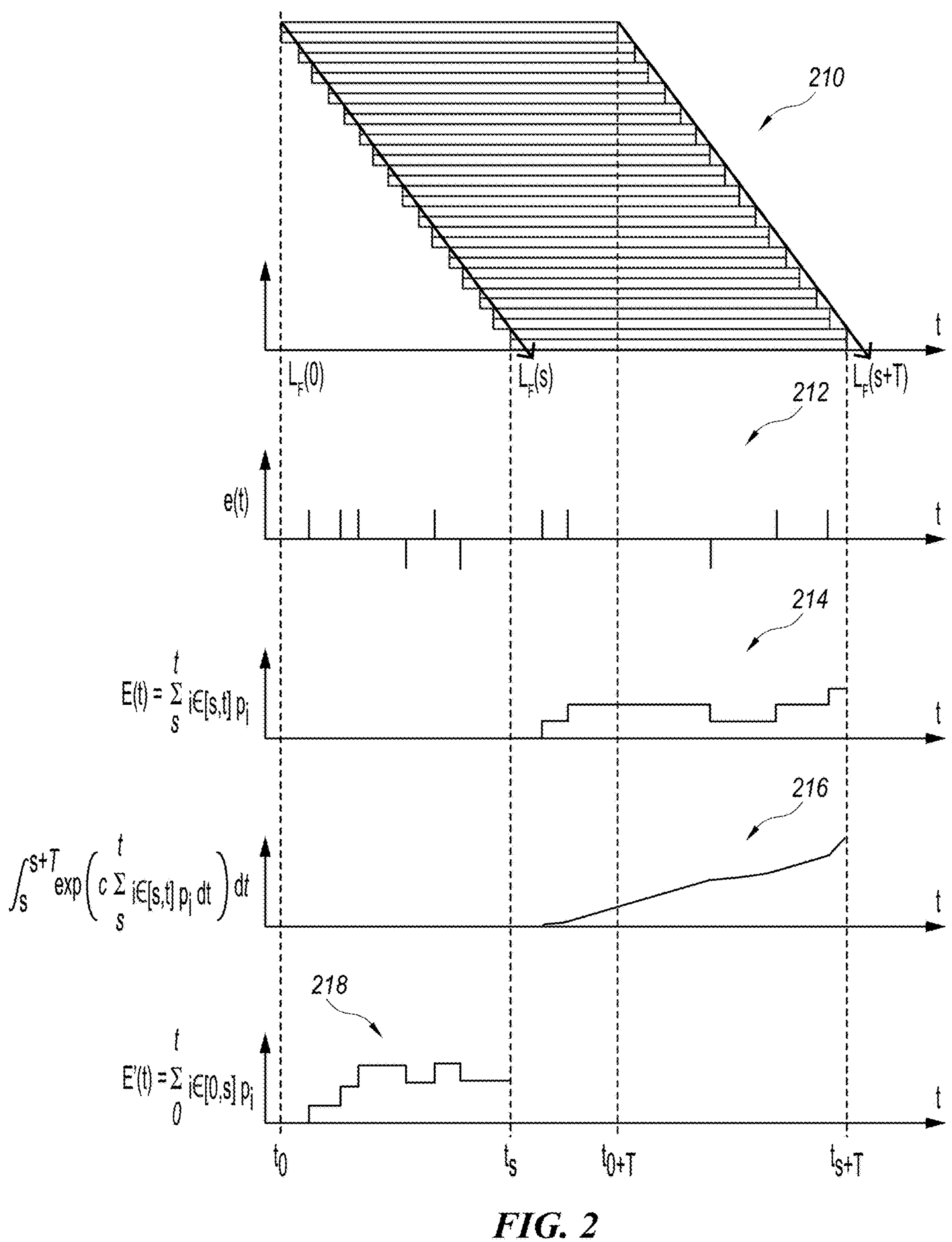
FIG. 2 are plots illustrating (a) an exposure period, (b) a sequence of event pulses formed into a time continuous signal, (c) sums of the event pulses of the sequence over time, and (d) the integral of the sum of the event pulses of the sequence over time.

Events detected at each time $t_i$ can be modeled using a unit impulse (Dirac function δ) multiplied by a corresponding polarity $p_i$. Detected events can be defined as a function of continuous time. For example, FIG. 2 illustrates various plots 210, 212, 214, 216, and 218. Plot 210 illustrates exposure periods for rows of CIS pixels in a pixel array, for one image frame. A rolling shutter is used such that exposure periods and readouts for the rows of pixels in the pixel array are staggered. The exposure period for a top two rows of the CIS pixel array extends between time $t_0$ and time $t_{0+T}$, and the exposure period for a bottom two rows of the CIS pixel array extends between time $t_s$ and $t_{s+T}$. Plot 212 illustrates a sequence of events detected by an EVS pixel that corresponds to the bottom two rows of the CIS pixel array. More specifically, the sequence of events detected between time $t_0$ and time $t_{s+T}$ is plotted as a time continuous signal e(t) comprising a sequence of unit impulses. The time continuous signal e(t) is modeled by Equation 13 below:

$$e(t) = p_i \cdot \delta(t - t_i) \qquad \text{Equation 13}$$

Because each event detected by the EVS pixel indicates a change between latent images captured at different times, a proportional change in intensity on pixels of the bottom two rows of the CIS pixel array over the exposure period for these pixel rows can be provided by the sum (or combination) of events detected by the corresponding EVS pixel between time $t_s$ and time t, as shown in Equation 14 below:

$$E(t) = \int_s^t e(\xi)d\xi = \sum\nolimits_{i\in[s,t]} p_i \qquad \text{Equation 14}$$

Plot 214 of FIG. 2 illustrates the time continuous signal E(t) that represents a sum of the events in the time continuous signal e(t) of the plot 212 of FIG. 2 between time $t_s$ and time $t_{s+T}$, corresponding to the exposure period for the bottom two rows of the CIS pixel array.

Using Equations 11 and 12 above, one can determine $\ln[L(t_i)]$ when $\ln[L(t_{i-1})]$ is known. Therefore, given a sequence of events specified by time continuous signal e(t), and assuming that c in Equation 11 above remains constant, one can (in the linear domain) determine a latent image L(t) at any given time t for CIS pixels of the bottom two rows of the array by incrementing over all events from a starting latent image L(s) at time $t_s$ to time t, as shown by Equation 15 below:

$$L(t) = L(s)\exp(cE(t)) = L(s)\exp\left(c\int_s^t e(\xi)d\xi\right) = L(s)\exp\left(c\sum\nolimits_{i\in[s,f]} p_i\right) \qquad \text{Equation 15}$$

As discussed above with reference to Equation 1, photocurrent photogenerated by the photosensor 101 is proportional to the latent image L(t) (or irradiance) at time t. Thus, the integral of the latent image L(t) over an exposure period extending between time $t_s$ and time $t_{s+T}$ corresponds to "charge" and can be related to frame information captured by CIS pixels of a frame-based image sensor. Moreover, as discussed above, a blurry intensity image captured by a frame-based image sensor can be regarded as the integral of a sequence of latent images over—or a combination of multiple latent images captured by the frame-based image sensor within—an exposure period extending between time $t_s$ and time $t_{s+T}$ during which events are accumulated. Therefore, a blurry frame B captured by a frame-based image sensor can, using Equation 15 above, be expressed by Equation 16 below:

$$B = \frac{1}{T}\int_s^{s+T} L(t)dt = \frac{L(s)}{T}\int_s^{s+T} \exp\left(c\int_s^t e(\xi)d\xi\right)dt = \frac{L(s)}{T}\int_s^{s+T} \exp\left(c\sum\nolimits_{i\in[s,t]} p_i\right)dt \qquad \text{Equation 16}$$

Plot 216 of FIG. 2 illustrates the integral of the time continuous signal E(t) of the plot 214 of FIG. 2 over time from the time $t_s$ to the time $t_{s+T}$.

Equation 16 above is known as the EDI model and provides a relation between a blurry frame B captured by a frame-based image sensor and a latent image L(s) at a CIS pixel at time $t_s$ (corresponding to the start of the frame/exposure period for that CIS pixel). This relation can be rearranged to find the latent image L(s), as shown by Equation 17 below:

$$L(s) = \frac{T \cdot B}{\int_s^{s+T} \exp\left(c\sum\nolimits_{i\in[st]} p_i\right)dt} \qquad \text{Equation 17}$$

The latent image L(s) in Equation 17 above takes the interpretation of a deblurred frame based on (a) the blurry frame B captured by a frame-based image sensor and (b) events detected by an EVS pixel across a corresponding exposure period. In other words, because events detected by the EVS pixel during an exposure period indicate changes between latent images captured by one or more active (CIS) pixels during the exposure period, the detected events can be used to perform event-guided deblur.

As discussed above, a rolling shutter can be used to capture and read out CIS information. For example, the exposure period for the top two rows of the CIS pixel array shown in the plot 210 of FIG. 2 starts at time $t_0$, which is before time $t_s$ at which the exposure period for the bottom two rows of the pixel array starts. Thus, at least some of the CIS information captured by CIS pixels of the top two rows is captured at different times than at least some of the CIS information captured by CIS pixels of the bottom two rows. As such, when (a) CIS information captured by CIS pixels of the top two and bottom two rows of the CIS pixel array are read out and (b) the latent images L(0) for the CIS pixels of the top two rows and the latent images L(s) for the CIS pixels of the bottom two rows are determined using Equation 17 above, the latent image $L_F(s)$ obtained from CIS information captured by CIS pixels of the entire array can include rolling shutter distortion (e.g., due to motion in an imaged scene that occurred between time $t_0$ and time $t_s$).

Events detected by the EVS pixel corresponding to the bottom two rows of the pixel array can be used to correct such distortion. More specifically, events detected by the EVS pixel between time $t_0$ and time $t_s$ (shown in plot 218 of FIG. 2) can be used to provide rolling shutter correction for CIS information captured by CIS pixels of the bottom two rows. In particular, a proportional change in intensity over the time period between time $t_0$ (corresponding to the start of the exposure period for the top two pixel rows of the CIS pixel array) and time $t_s$ (corresponding to the start of the exposure period for the bottom two rows of the CIS pixel array) can be provided by the sum (or combination) of events detected by the corresponding EVS pixel between time $t_0$ and time $t_s$, as shown in Equation 18 below:

$$E'(t) = \int_0^s e(\xi)d\xi = \sum_{i\in[0,s]} p_i \quad \text{Equation 18}$$

The plot 218 of FIG. 2 illustrates a time continuous signal E'(t) that represents a sum of the events in the time continuous signal e(t) of the plot 212 of FIG. 2 between time $t_0$ and time $t_s$.

As discussed above, Equations 11 and 12 can be used to determine $\ln[L(t_i)]$ when $\ln[L(t_{i-1})]$ is known. Therefore, given the sequence of events specified by the time continuous signal e(t) between time $t_0$ and time $t_s$, and assuming that c in Equation 11 above remains constant, one can (in the linear domain) determine a latent image L(s) for a CIS pixel at time $t_s$ by (i) integrating/incrementing over all events detected by a corresponding EVS pixel from time $t_0$ to time $t_s$ and (ii) multiplying the accumulated events by a starting latent image L(0), as shown by Equation 19 below:

Equation 19

$$L(s) = L(0)\exp(cE'(t)) = L(0)\exp\left(c\int_0^s e(\xi)d\xi\right) = L(0)\exp\left(c\sum_{i\in[0,s]} p_i\right)$$

Therefore, given Equations 17 and 19 above, one can solve for the latent image L(0) of a CIS pixel and obtain it using Equation 20 below:

Equation 20

$$L(0) = \frac{L(s)}{\exp\left(c\sum_{i\in[0,s]} p_i\right)} = \frac{T\cdot B}{\exp\left(c\sum_{i\in[0s]} p_i\right)\cdot\int_s^{s+T}\exp\left(c\sum_{i\in[st]} p_i\right)dt}$$

L(0) in Equation 20 above corresponds to a deblurred, rolling-shutter-distortion-corrected latent frame. Thus, the latent frame $L_F(0)$ for the entire pixel array can be obtained using the latent frames L(0) for individual CIS pixels in the array.

Many event-guided-deblur solutions use an active image sensor to capture CIS data and a separate event vision sensor to capture EVS data. Such dual-sensor configurations, however, have several shortcomings, such as parallax errors introduced because the sensors are not collocated, complexities in spatial and temporal synchronization of the CIS data and the EVS data, and added costs (e.g., due to the need for two pairs of lenses, packages, etc.). Although these shortcomings can be overcome by using hybrid image sensors, all existing event-guided-deblur solutions known to the inventors of the present disclosure output CIS data and EVS data to application processors external to the hybrid image sensors, for the application processors to perform event-guided deblur off-chip. Such off-chip, event-guided-deblur solutions and rolling-shutter-correction solutions suffer from several additional shortcomings, many of which are discussed below with reference to FIG. 3.

Figure 3:
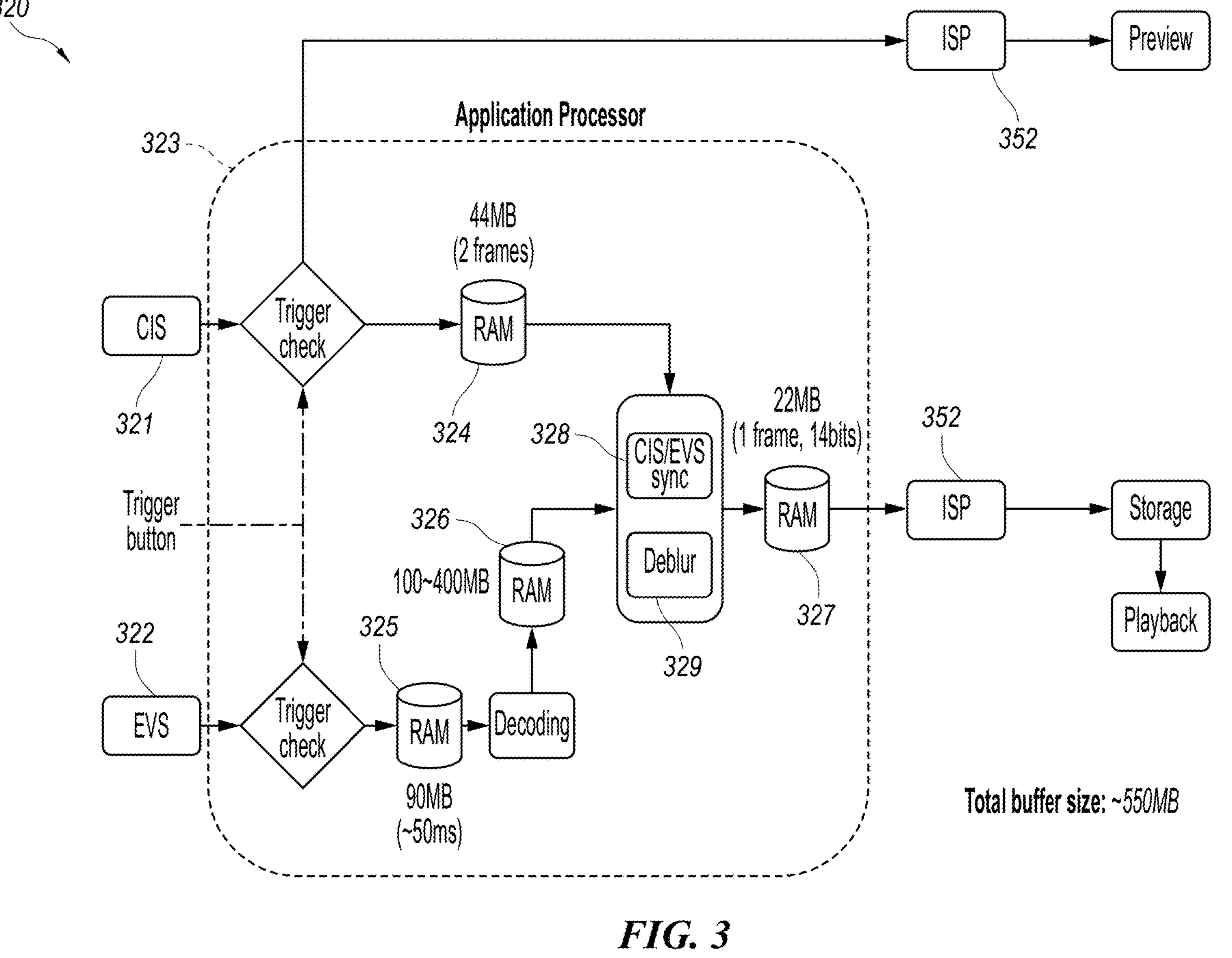
FIG. 3 is a partially schematic diagram illustrating an example of an imaging system with off-chip image deblur.

FIG. 3 is a partially schematic diagram illustrating an example of an imaging system 320 that performs event-guided deblur off-chip. As shown, CIS data 321 and EVS data 322 is output to an application processor 323 of the imaging system 320 from either (a) a hybrid image sensor (not shown) of the imaging system 320 or (b) an active pixel sensor (not shown) and a separate event vision sensor (not shown) of the imaging system 320. The application processor 323 is configured to (a) perform event-guided deblur of the CIS data 321 using the EVS data 322 and (b) output deblurred image frames to an image signal processor 352.

One drawback of off-chip, event-guided-deblur solutions is the need for a relatively large amount of memory. For example, to perform event-guided deblur, the application processor 323 uses a first buffer 324, a second buffer 325, a third buffer 326, and a fourth buffer 327. More specifically, the first buffer 324 is used to store two frames of CIS image data. One of the frames is used to sync the CIS data 321 with the EVS data 322 at a CIS/EVS sync block 328 of the application processor 323, and the other of the frames is deblurred by the application processor 323 using the EVS data 322 at a deblur block 329 of the application processor 323. In one example, the first buffer 324 can be approximately 44 MB in size for a 12-megapixel image sensor. The second buffer 325 is used to store the EVS data 322 prior to decoding, and the third buffer 326 is used to store the EVS data 322 after decoding. In one example, the second buffer 325 can be configured to store approximately 50 ms of the EVS data 322 and can therefore be approximately 90 MB in size. As such, depending on the decoding, the third buffer 326 can be approximately 100-400 MB in size. The fourth buffer 327 can be configured to store a deblurred image frame and can therefore be approximately 22 MB in size for a 12-megapixel image sensor. As such, continuing with the above examples, the application processor 323 can require approximately 550 MB of memory to perform event-guided deblur of the CIS data 321 using the EVS data 322.

Other drawbacks of off-chip, event-guided deblur solutions include that such solutions (i) suffer from relatively large latency and (ii) cannot support real-time video. For example, as shown in FIG. 3, the CIS data 321 and the EVS data 322 is output to the external application processor 323 (causing a 1-frame delay). In addition, the application processor 323 introduces additional delays while performing the event-guided beblur calculation. For example, the application processor 323 can take up to 1 second to process one 12-megapixel image. As a result, the off-chip, event-guided deblur solution illustrated by FIG. 3 is only able to process still images, meaning that this solution cannot support real-time video.

Still other drawbacks of off-chip, event guided deblur solutions include (i) the requirement for relatively high input/output (IO) bandwidth between the image sensor(s) and an external application processor, and (ii) consumption of a relatively large amount of power. For example, as shown in FIG. 3, both the CIS data 321 and the EVS data 322 are output from the image sensor(s) to the application processor 323, which requires a relatively high IO throughput (e.g., approximately 20 Gbps for a 12-megapixel, 30 fps image sensor). Such high IO throughput and long data processing time (e.g., up to 1 second, as discussed above) leads to consumption of a relatively large amount of power.

One other drawback of off-chip, event guided deblur solutions is the complexity of the interface between the image sensor(s) and downstream components of an imaging system. For example, rather than outputting deblurred image frames, the image sensor(s) (not shown) of the imaging system 320 of FIG. 3 output(s) raw CIS data 321 and raw EVS data 322, requiring a relatively complex application processor 323 and corresponding interface with the image sensor(s).

To address these concerns, several embodiments of the present described herein are generally directed to hybrid image sensors with on-chip image deblur and rolling shutter distortion correction capabilities. For example, several embodiments of the present technology described in detail below are directed to image sensors with the following on-chip capabilities: (a) synchronization of CIS data captured using active (CIS) pixels with EVS data captured using EVS pixels, (b) image deblur, and/or (c) rolling shutter distortion correction. In some embodiments, the on-chip image deblur can include on-chip, event-guided deblur. In these and other embodiments, the on-chip rolling shutter distortion correction can include on-chip, event-guided rolling shutter distortion correction.

The present technology is expected to offer several advantages. For example, in comparison to the off-chip, event-guided deblur solutions discussed above, the present technology is expected to reduce or minimize (a) an amount of memory required to perform image deblur and rolling shutter distortion correction; (b) latency associated with performing image deblur and rolling shutter distortion correction; (c) required IO bandwidth/throughput; and/or (d) an amount of power required to perform image deblur and rolling shutter distortion correction. As such, the present technology is also expected to support real-time video in addition to the processing of still images. Moreover, because image deblur and rolling shutter distortion correction are performed on-chip (e.g., entirely or partially internal the image sensor, and/or without first outputting or needing to first output raw CIS data and/or raw EVS data from the image sensor), images sensors configured in accordance with various embodiments of the present technology are able to output deblurred, rolling-shutter-distortion-corrected image frames (e.g., in addition to or in lieu of raw CIS data and/or raw EVS data), meaning that the interface between such images sensors and downstream components of corresponding imaging systems can be simplified in comparison to the off-chip, event-guided deblur solutions discussed above.

Figure 4A:
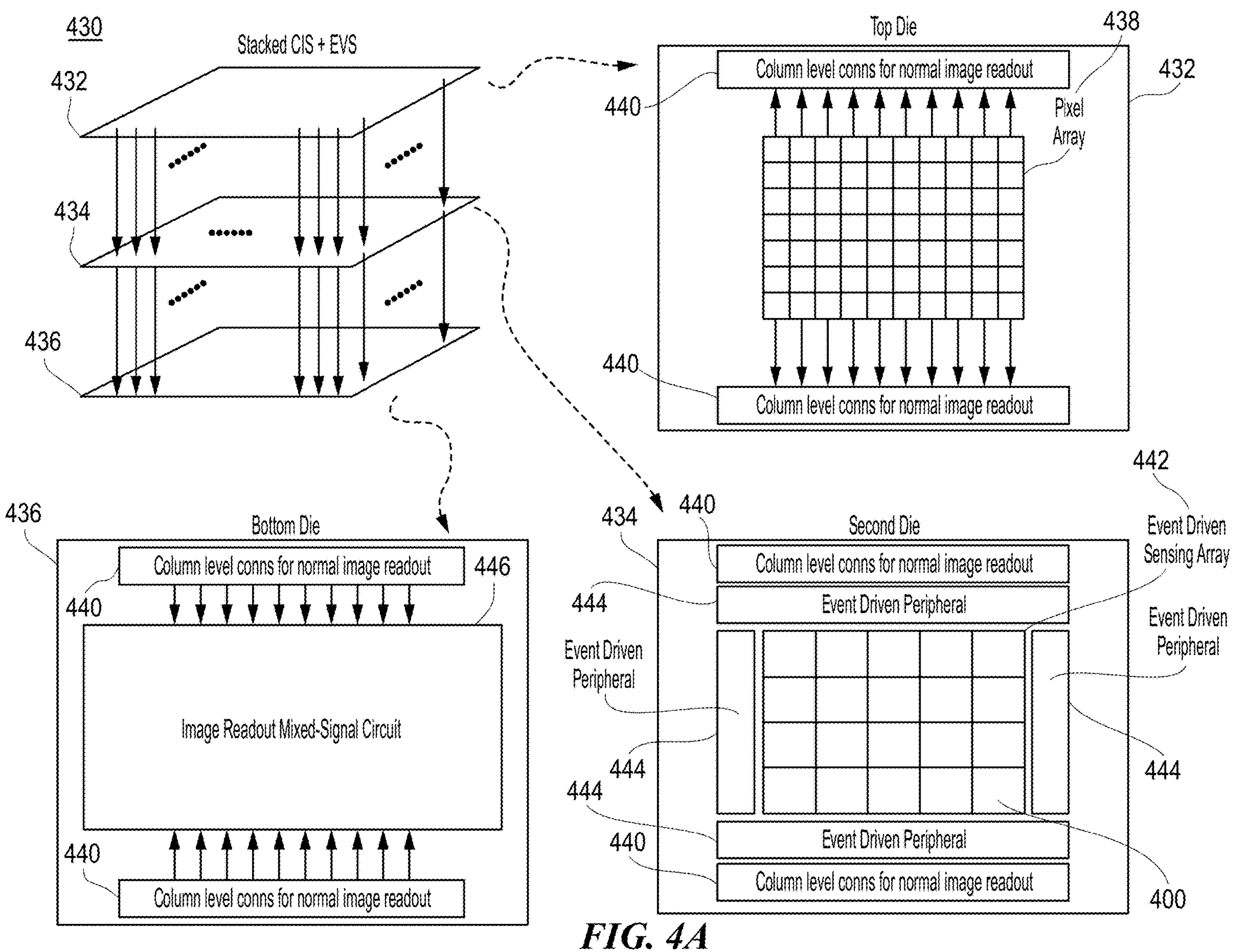
FIG. 4A is a partially schematic diagram of a stacked hybrid complementary metal oxide semiconductor (CMOS) image sensor (CIS) and event-based vision sensor (EVS) system, configured in accordance with various embodiments of the present technology.

B. Selected Embodiments of Hybrid Image Sensors with On-Chip Image Deblur and Rolling Shutter Correction, and Associated Systems, Devices, and Methods FIG. 4A is a partially schematic diagram of a stacked complementary metal oxide semiconductor (CMOS) image sensor (CIS) with an event-based vision sensor (EVS) system 430 ("the stacked system 430" or "the image sensor 430"), configured in accordance with various embodiments of the present technology. As shown, the stacked system 430 includes a first die 432, a second die 434, and a third die 436 that are stacked and coupled together in a stacked chip scheme. In some embodiments, the first die 432, the second die 434, and the third die 436 are semiconductor dies that include a suitable semiconductor material (e.g., silicon). In illustrated embodiment, the first die 432 (also referred to herein as the "top die") includes a pixel array 438. The third die 436 (also referred to herein as the "bottom die") includes image readout circuitry 446 (also referred to herein as "image readout mixed-signal circuitry"). The image readout circuitry 446 can be coupled to the pixel array 438 of the first die 432 through column level connections for normal image readout 440. In some embodiments, the column level connections for normal image readout 440 are implemented from column bitlines of the pixel array 438 with through silicon vias (TSVs) that extend between the first die 432 and the third die 436, and that are routed through the second die 434.

In some embodiments, the pixel array 438 is a two-dimensional (2D) array including a plurality of pixel cells (also referred to as "pixels") that each includes at least one photosensor (e.g., at least one photodiode) exposed to incident light. As shown in the illustrated embodiment, the pixels are arranged into rows and columns. Some of the pixels can be configured as CMOS image sensor (CIS) pixels that are configured to acquire image data of a person, place, object, etc., which can then be used to render images and/or video of a person, place, object, etc. For example, each CIS pixel is configured to photogenerate image charge in response to the incident light. After each CIS pixel has acquired its image charge, the corresponding analog image charge data can be read out by the image readout circuitry 446 in the third die 436 through the column bit lines. In some embodiments, the image charge from each row of the pixel array 438 may be read out in parallel through column bit lines by the image readout circuitry 446. As discussed in greater detail below, others of the pixels of the pixel array 438 can be configured as event vision sensor (EVS) pixels.

The image readout circuitry 446 in the third die 436 can include amplifiers, analog to digital converter (ADC) circuitry, associated analog support circuitry, associated digital support circuitry, etc., for normal image readout and processing. In some embodiments, the image readout circuitry 446 may also include event driven readout circuitry, which will be described in greater detail below. In operation, the photogenerated analog image charge signals are read out from the pixel cells of pixel array 438, amplified, and converted to digital values in the image readout circuitry 446. In some embodiments, image readout circuitry 446 may read out a row of image data at a time. In other examples, the image readout circuitry 446 may read out the image data using a variety of other techniques (not illustrated), such as a serial readout or a full parallel readout of all pixels simultaneously. The image data may be stored or even manipulated by applying post image effects (e.g., crop, rotate, remove red eye, adjust brightness, adjust contrast, and the like).

In the illustrated embodiment, the second die 434 (also referred to herein as the "middle die") includes an event driven sensing array 442 that is coupled to at least some of the pixels (e.g., EVS pixels) of the pixel array 438 in the first die 432. In some embodiments, the event driven sensing array 442 is coupled to the pixels of the pixel array 438 through hybrid bonds between the first die 432 and the second die 434. The event driven sensing array 442 can include an array of event driven circuits. In some embodiments, each one of the event driven circuits in the event driven sensing array 442 is coupled to at least one of the plurality of pixels of the pixel array 438 through hybrid bonds between the first die 432 and the second die 434 to asynchronously detect events that occur in light that is incident upon the pixel array 438 in accordance with the teachings of the present disclosure.

In some embodiments, corresponding event detection signals are generated by the event driven circuits (e.g., that are similar to the event sensing front-end circuit illustrated in FIG. 1) in the event driven sensing array 442. The event detection signals can be received and processed by event driven peripheral circuitry 444 that, in some embodiments, is arranged around the periphery of the event driven sensing array 442 in the second die 434, as is shown in FIG. 4A. The embodiment illustrated in FIG. 4A also illustrates column level connections for normal image readout 440 that are routed through the second die 434 between the first die 432 and the third die 436.

Figures 4B, 4C:
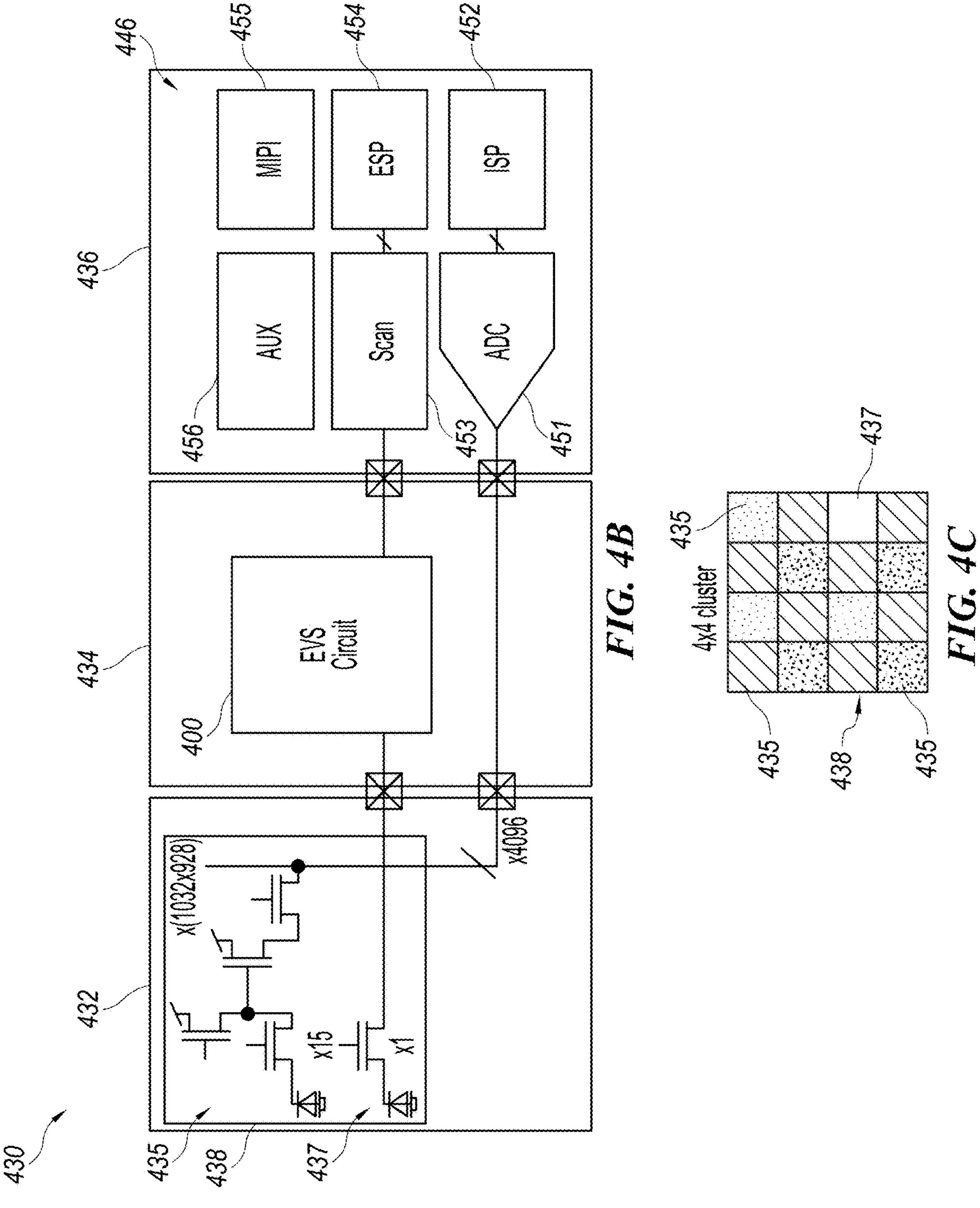
FIG. 4B is a partially schematic diagram of a specific example of the system of FIG. 4A.
FIG. 4C is a partially schematic diagram of a 4×4 pixel cluster configured in accordance with various embodiments of the present technology.

FIG. 4B is a partially schematic diagram of a specific example of the stacked system 430 of FIG. 4A. As shown in FIG. 4B, the stacked system 430 includes the pixel array 438 on the first die 432 (only a portion of the pixel array 438 is shown in FIG. 4B), an event driven circuit 400 of the event driven sensing array 442 on the second die 434, and image readout circuitry 446 on the third die 436. The image readout circuitry 446 includes analog-to-digital converters 451 ("the ADC 451"), an image signal processor 452, scan readout circuitry 453, an event signal processor 454, a synchronous communications interface 455 (e.g., a mobility industry processor interfaces (MIPI) transmitter and/or receiver), and various auxiliary circuits 456. As discussed in greater detail below, the image readout circuitry 446 can also include a deblur circuit (e.g., for performing event-guided deblur and/or rolling shutter distortion correction of CIS data).

The portion of the pixel array 438 shown in FIG. 4B corresponds to a 4×4 cluster of pixels in the pixel array 438. Such a cluster can be repeated across the pixel array 438. In the illustrated embodiment, fifteen (15) of the pixels of the cluster are configured as active (CIS) pixels 435 to capture CIS information (e.g., intensity information) corresponding to light incident on photosensors of those pixels. In addition, one of the pixels of the cluster is configured as an EVS pixel 437 to capture non-CIS information (e.g., contrast information, event data) corresponding to light incident on a photosensor of the EVS pixel 437. FIG. 4C illustrates a specific example of the 4×4 pixel cluster of FIG. 4B in which the CIS pixels 435 are arranged in a Bayer pattern to capture CIS (frame) information corresponding to light incident on the cluster, and the EVS pixel 437 is arranged to detect EVS (asynchronous event) information corresponding to light incident on the cluster. The CIS pixels 435, of course, can be arranged in another pattern besides a Bayer pattern in other embodiments of the present technology.

Referring again to FIG. 4B, the CIS pixels 435 of the cluster and the EVS pixel 437 of the cluster are read out independently. More specifically, CIS information captured by the CIS pixels 435 are read out through the second die 434 to the ADC 451 on the third die 436 using corresponding row/column control circuitry (not shown). Non-CIS information captured by the EVS pixel 437 is read out to the event driven circuit 400 on the second die 434 using corresponding row/column control circuitry (not shown), and events detected by the event driven circuit 400 are read out by the scan readout circuitry 453 on the third die 436. The CIS information captured by the CIS pixels 435 of the pixel array 438 is frame-based and can be readout out from the CIS pixels 435 row-by-row at the end of an exposure period. By contrast, the non-CIS information captured by the EVS pixel 437 is used by the event driven circuit 400 to asynchronously detect/trigger events, and the events can be read out according to a row scan readout scheme or a column scan readout scheme. Row scan readout schemes are discussed in greater detail below.

In some embodiments, row/column control circuitry corresponding to the CIS pixels 435 can be allocated on a same die as—or a different die from—the die (e.g., the third die 436) on which the ADC 451 is allocated. In these and other embodiments, row/column control circuitry corresponding to the EVS pixels 437 can be allocated on a same die as—or a different die from—the die (e.g., the third die 436) on which the scan readout circuitry 453 is allocated. In these and still other embodiments, the ADC 451 and/or the row/column control circuitry corresponding to the CIS pixels 435 can be allocated on a same die as—or a different die from—the die (e.g., the third die 436) on which the scan readout circuitry 453 and/or the row/column control circuitry corresponding to the EVS pixel 437 is/are allocated.

In the illustrated embodiment, the EVS pixel 437 is dedicated to capturing non-CIS (EVS) information while the CIS pixels 435 are dedicated to capturing CIS information. In other embodiments, the EVS pixel 437 and/or one or more of the CIS pixels 435 can be switched between being configured to capture CIS information and non-CIS information. This can enable the stacked system 430 to operate in a CIS-only mode in which all of the pixels 435 and the pixel 437 are used to capture CIS information, an EVS-only mode in which all of the pixels 435 and the pixel 437 are used to capture non-CIS (EVS) information, and/or a hybrid CIS and EVS mode in which a first subset of the pixels 435, 437 are used to capture CIS information and a second subset of the pixels 435, 437 are used to capture non-CIS (EVS) information.

In some embodiments, the event driven circuit 400 on the second die 434 has a same die size as the 4×4 pixel cluster on the first die 432. In other embodiments, the event driven circuit 400 can have a different die size from the 4×4 pixel cluster. Additionally, or alternatively, although the ratio of CIS pixels to EVS pixels is 15:1 in the 4×4 pixel cluster, other ratios of CIS pixels to EVS pixels (e.g., 14:2, 12:4, 8:8, 4:12, 2:14, 15:1) are possible and fall within the scope of the present technology. Moreover, although the EVS pixel 457 of FIG. 4B corresponds to a 4×4 pixel cluster, other arrangements (e.g., an EVS pixel corresponding to 1×1 pixels clusters, 4×2 pixel clusters, etc.) are possible and within the scope of the present technology. Furthermore, although one row of EVS pixels (e.g., the row including the EVS pixel 457) corresponds to four rows of CIS pixels in FIG. 4B, other arrangements are possible and within the scope of the present technology. For example, each row of EVS pixels can correspond to (a) one row of CIS pixels, (b) to two rows of CIS pixels, (c) to three rows of CIS pixels, or (d) to more than four rows of CIS pixels. Examples of other CIS pixel resolutions to EVS pixel resolutions are described in the cofiled, copending, and coassigned application titled "METHODS FOR OPERATING HYBRID IMAGE SENSORS HAVING DIFFERENT CIS-TO-EVS RESOLUTIONS," which has been incorporated by reference herein in its entirety above.

Figure 5:
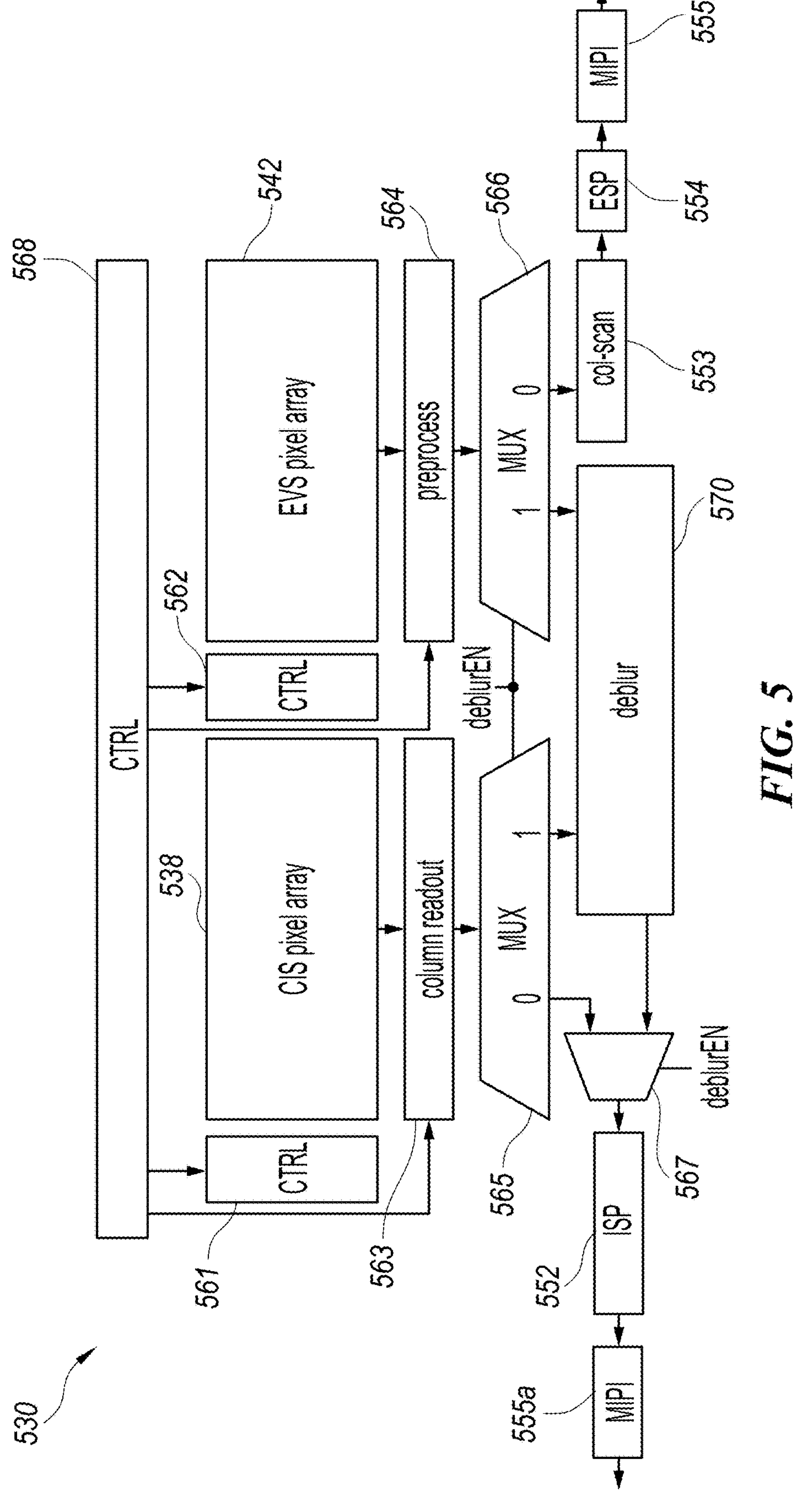
FIG. 5 is a partially schematic block diagram of an image sensor configured in accordance with various embodiments of the present technology.

As discussed above, event data captured using EVS pixels can be used to perform event-guided deblur and/or rolling shutter distortion correction of CIS (frame) information captured using CIS pixels. To this end, FIG. 5 is a partially schematic block diagram of an image sensor 530 that can include on-chip image deblur and/or rolling shutter correction capabilities and that is configured in accordance with various embodiments of the present technology. The image sensor 530 can be an example of the stacked system 430 of FIG. 4A and/or FIG. 4B described above, or of other image sensors configured in accordance with the present technology.

As shown, the image sensor 530 includes a CIS pixel array 538 (e.g., similar to the pixel array 438 of FIG. 4A, FIG. 4B, and/or FIG. 4C) and/or an event driven sensing array 542 (e.g., similar to the event driven sensing array 442 of FIG. 4A, FIG. 4B, and/or FIG. 4C). The image sensor 530 further includes (a) row/column control circuitry 561 and column readout circuitry 563 for controlling operation and readout of CIS pixels included in the pixel array 538, and (b) row/column control circuitry 562 for controlling operation and readout of EVS pixels included in the event driven sensing array 542. The image sensor 530 may optionally include a preprocessing circuit 564 for performing various operations (e.g., denoising) on EVS data read out from EVS pixels of the event driven sensing array 542.

The image sensor 530 further includes a common control block 568 for synchronizing operation of the pixel array 538 with operation of the event driven sensing array 542. More specifically, although CIS pixels of the pixel array 538 and EVS pixels of the event driven sensing array 542 include their own row/column control circuitry and are independently read through their own readout circuitry, the common control block synchronizes operation (e.g., reset, exposure start times, exposure end times) of the CIS pixels, the EVS pixels, the row/column control circuits, and/or the readout circuits. This synchronization is described in greater detail below with reference to FIGS. 10-12.

In some embodiments, the image sensor 530 can include a first multiplexer 565, a second multiplexer 566, and/or a third multiplexer 567. As shown, the first multiplexer 565, the second multiplexer 566, and the third multiplexer 567 can be controlled using a deblur enable signal deblurEN. When the deblur enable signal deblurEN is un-asserted (e.g., is in a low or '0' state), the first multiplexer 565 and the third multiplexer 567 can stream CIS data (e.g., raw intensity image frames, blurry intensity image frames) to an image signal processor 552 of the image sensor 530, such as in lieu of streaming the raw CIS data to a deblur and rolling-shutter-distortion correction circuit 570 ("the deblur circuit 570" or "the rolling shutter distortion correction circuit 570") of the image sensor 530. In turn, the image signal processor 552 can provide the CIS data to a synchronous communications interface 555*a* (e.g., a MIPI interface/transmitter), such as for output from the image sensor 530.

Additionally, or alternatively, when the deblur enable signal deblurEN is un-asserted (e.g., is in a low or '0' state), the second multiplexer 566 can stream EVS data to the column-scan readout circuitry 553, such as in lieu of streaming the EVS data to the deblur circuit 570. In turn, the column-scan readout circuitry 553 can provide the EVS data to an event signal processor 554 of the image sensor 530, and the event signal processor 554 can provide the EVS data to a synchronous communications interface 555*b* (e.g., a MIPI interface/transmitter), such as for output from the image sensor 530.

In the illustrated embodiment, the synchronous communications interface 555*a* and the synchronous communications interface 555*b* can be independent physical interfaces. Alternatively, the synchronous communications interface 555*a* and the synchronous communications interface 555*b* can be merged. For example, CIS data and EVS data can be output from the image sensor 530 via a shared synchronous communications interface 555 (e.g., a shared MIPI interface, a shared virtual channel, embedded line).

Referring again to the first multiplexer 565, the second multiplexer 566, and the third multiplexer 567, when the deblur enable signal deblurEN is asserted (e.g., is in a high or '1' state), the first multiplexer 565 is enabled to stream CIS information read from CIS pixels of the pixel array 538 into the deblur circuit 570, and the second multiplexer 566 is enabled to stream EVS information read from EVS pixels of the event driven sensing array 542 into the deblur circuit 570. For example, when the deblur enable signal deblurEN is asserted, EVS information read from EVS pixels of the event driven sensing array 542 can be constantly streamed into the deblur circuit 570 via the second multiplexer 566 (e.g., while CIS pixels of the pixel array 538 integrate photogenerated charge over an exposure period). Additionally, or alternatively, when CIS information is read out from CIS pixels of the pixel array 538 after the exposure period, digitized CIS information can be streamed into the deblur circuit 570 via the first multiplexer 565.

In turn, the deblur circuit 570 (*a*) can compute a fused image/video stream from the CIS data and the EVS data received via the first multiplexer 565 and the second multiplexer 566, respectively, and (b) can output the fused image/video stream into the third multiplexer 567 for streaming to the image signal processor 552. The fused image/video stream may then be provided from the image signal processor 552 to the synchronous communications interface 555*a* for output from the image sensor 530. The fusion computations performed by the deblur circuit 570 can be targeted at deblurring the CIS frame information captured by CIS pixels of the pixel array 538, correcting for rolling shutter artifacts, and/or creating interpolated video frames. On-chip deblurring of CIS frame information and rolling shutter correction of CIS frame information are discussed in greater detail below with reference to FIGS. 6-14.

In embodiments in which the image sensor 530 is a stacked system, components of the deblur circuit 570 can be positioned on one or more of the dies (e.g., a top die, a middle die, or a bottom die) of the stacked system. As a specific example, the image sensor 530 can be generally similar to the stacked system 430 of FIGS. 4A and 4B described above, and the deblur circuit 570 of the image sensor 530 can be positioned on a third (or bottom) die of the image sensor 530.

In some embodiments, the first multiplexer 565, the second multiplexer 566, and/or the third multiplexer 567 shown in FIG. 5 can be omitted. In at least some of these embodiments, the image sensor 530 can be operated in a manner generally similar to how the image sensor 530 illustrated in FIG. 5 would operate if the deblur enable signal deblurEN was perpetually in the asserted state (e.g., by always streaming CIS information and EVS information into the deblur circuit 570 for the deblur circuit 570 to compute a fused image/video stream). Additionally, or alternatively, the image sensor 530 can be configured to output the raw CIS data and/or the EVS data. For example, the image sensor 530 can output the raw CIS data and/or the EVS data in addition to or in lieu of outputting a fused image/video steam based on the raw CIS data and the EVS data. Furthermore, although the image signal processor 552 of the image sensor 530 illustrated in FIG. 5 is configured to process the fused image/video stream output by the deblur circuit 570 when the deblur enable signal deblurEN is asserted, the image signal processor 552 in other embodiments can be configured to process CIS information read out from CIS pixels of the pixel array 538 prior to the deblur circuit 570 computing a fused image/video stream. In such embodiments, after processing the CIS information read out from CIS pixels of the pixel array 538, the image signal processor 552 can output the processed CIS information to the deblur circuit 570 for the deblur circuit 570 to compute a fused image/video stream based on the processed CIS information (e.g., as opposed to based on the raw CIS information).

Figure 6:
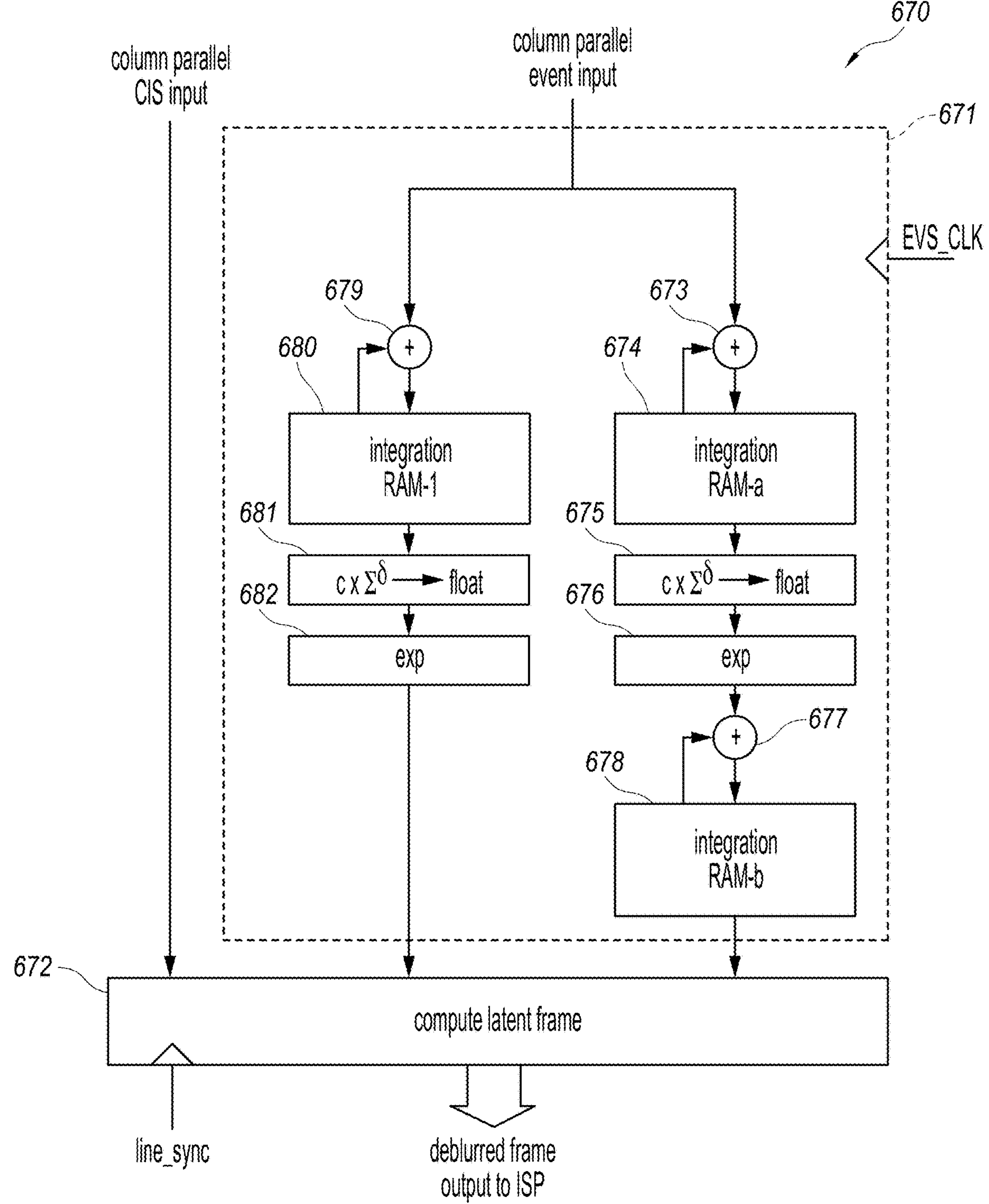
FIG. 6 is a partially schematic diagram of a deblur and rolling-shutter-distortion correction circuit configured in accordance with various embodiments of the present technology.

FIG. 6 is a partially schematic diagram of a deblur and rolling shutter distortion correction circuit 670 ("deblur circuit 670" or "rolling shutter distortion correction circuit 670") configured in accordance with various embodiments of the present technology. The deblur circuit 670 can be an example of the deblur circuit 570 of FIG. 5, or of other deblur circuits configured in accordance with the present technology. As shown, the deblur circuit 670 includes a rolling shutter distortion correction and event-based double integral (EDI) computation block 671 ("computation block 671") and a latent frame computation block 672. Operation of at least a portion of the computation block 671 can be clocked by a control signal EVS_CLK that at least generally follows the time continuous signal e(t) of Equation 13 above, an example of which is shown in plot 212 of FIG. 2. In other words, operation of at least a portion of the computation block 671 can be enabled whenever an event is triggered and read out from an EVS pixel. Operation of the latent frame computation block 672 can be clocked by a control signal line_sync. The control signal line_sync can be provided/controlled by a common control block of an image sensor corresponding to the deblur circuit 670, such as the common control block 568 of the image sensor 530 of FIG. 5. In some embodiments, the control signal line_sync can correspond to the duration of the exposure period T, as shown in Equations 16 and 17 above. In these and other embodiments, the control signal line_sync can correspond to a duration of time extending between (i) a start of an exposure period for a first row of CIS pixels in a CIS pixel array and (ii) an end of an exposure period of a last row of CIS pixels in a CIS pixel array.

In the illustrated embodiment, the computation block 671 includes a plurality of EDI components. The EDI components of the computation block 671 include a counter 673, a first integration buffer 674, a product computation block 675, an exponential computation block 676, an integration computation block 677, and a second integration buffer 678. The counter 673 is also referred to herein as a "first counter," the product computation block 675 is also referred to herein as a "first product computation block," and the exponential computation block 676 is also referred to herein as a "first exponential computation block." The first integration buffer 674 and the second integration buffer 678 are also referred to herein as "EDI integration buffers."

The counter 673 can be an integer counter (e.g., an up/down counter) or another suitable type of counter for computing a running sum of events detected by each EVS pixel during an exposure period for CIS pixels corresponding to the EVS pixel, and the first integration buffer 674 can be configured to track/store the running sums. More specifically, the counter 673 and the first integration buffer 674 can be configured to compute the first, inner integral of the EDI model described above. For example, as event data is detected by an EVS pixel and streamed into the deblur circuit 670 during an exposure period for CIS pixels corresponding to that EVS pixel, the counter 673 can be enabled via the control signal EVS_CLK, which can cause the counter 673 to increment or decrement (depending on the polarity of the detected event) a running sum maintained by the first integration buffer 674 for that EVS pixel. For each EVS pixel, the running sum maintained by the first integration buffer 674 over time is equivalent to E(t) shown in Equation 14 above, an example of which is shown in plot 214 of FIG. 2. The buffer size of the first integration buffer 674 can be relatively small for such an implementation. As a specific example, assuming the duration of an exposure period for CIS pixels corresponding to an EVS pixel is 33 ms, the first integration buffer 674 can include a buffer size of approximately 10 bits/pixel. In some embodiments, a floating-point calculator can be used in lieu of the counter 673. In such embodiments, the first integration buffer 674 may have a larger or smaller buffer size.

The product computation block 675, the exponential computation block 676, the integration computation block 677, and the second integration buffer 678 can be configured to compute the second, outer integral of the EDI model described above. For example, the product computation block 675 can multiply running sums stored in the first integration buffer 674 by a contrast threshold parameter c, which is equivalent to $C_{log\text{-}TH}$ (described above with reference to Equations 6-12 and 15-17) and is assumed to remain constant. Thus, for each EVS pixel, the output of the product computation block 675 can be equivalent to $c\ \Sigma_{i\in[s,t]} p_i$. Thereafter, for each EVS pixel, the exponential computation block 676 can determine the exponential of the output of the product computation block 675, resulting in $\exp(c\ \Sigma_{i\in[s,t]} p_i)$. The integration computation block 677 can, for each EVS pixel, continuously integrate the output of the exponential computation block 676 over time. More specifically, the integration computation block 677 can integrate each of the outputs of the exponential computation block 676 from time $t_s$ (corresponding to the start of an exposure period for CIS pixels corresponding to a respective EVS pixel) to time t, ending at time $t_{s+T}$ (corresponding to the end of the exposure period for the CIS pixels corresponding to the respective EVS pixel). The second integration buffer 678 can track/store the results of this time continuous integration, which are each equivalent to $$\int_{s}^{s+T}$$

exp (c $\Sigma_{i\in[s,t]}p_i$) dt at the end of each corresponding exposure period. Example results for an EVS pixel output by the integration computation block 677 are shown in the plot 216 of FIG. 2.

Each of the computations performed by the product computation block 675, the exponential computation block 676, the integration computation block 677, and the second integration buffer 678 can be performed in floating point representation, such as 9-bit mantissa and 4-bit exponent. In addition, although operation of the counter 673 and/or the first integration buffer 674 can be clocked by the control signal EVS_CLK, the product computation block 675, the exponential computation block 676, the integration computation block 677, and/or the second integration buffer 678 can be enabled to continuously perform their respective operations over time. As a specific example, in some embodiments, operation of the integration computation block 677 is not clocked by the control signal EVS_CLK nor triggered by events. Rather, the integration computation block 677 is configured to continuously integrate the outputs of the exponential computation block 676 over time, at least between time $t_s$ and time $t_{s+T}$ corresponding to the start and stop times, respectively, of a corresponding exposure period. In these embodiments, operation of the product computation block 675 and/or the exponential computation block 676 can be clocked by the control signal EVS_CLK or enabled to continuously perform their respective operations over time.

Because events detected at each EVS pixel during a corresponding exposure period are accumulated by the EDI components of the computation block 671, raw EVS data input into the computation block 671 of the deblur circuit 670 during a corresponding exposure period can be discarded once events of the raw EVS data have been accumulated by the EDI components of the computation block 671. As a result, in some embodiments, the second integration buffer 678 stores/maintains only the accumulated results of the integration computation block 677, meaning that the second integration buffer 678 can have a relatively small buffer size (e.g., ~9 MB, such as about 8.625 MB or about 13 bits/pixel) in comparison to buffers utilized in off-chip, event-guided deblur solutions. In addition, because the raw EVS data can be discarded rather than output from an image sensor corresponding to the deblur circuit 670, IO throughput and power consumption can be reduced in comparison to off-chip, event-guided deblur solutions in which the raw EVS data is output from the image sensor to an external application processor. In other embodiments of the present technology, all or a subset of the raw EVS data can be stored and/or output from the image sensor after events in the raw EVS data are accumulated.

After the exposure period ends, CIS data can be read out from CIS pixels of the image sensor and streamed into the latent frame computation block 672 of the deblur circuit 670. At this point, the latent frame computation block 672 can deblur the CIS data by combining/fusing the CIS data with the accumulated EVS data stored in the second integration buffer 678 of the computation block 671. More specifically, for one or more of the CIS pixels, the latent frame computation block 672 can compute one or more latent image frames L(s), each corresponding to a time $t_s$ (representing a start of a corresponding exposure period), by performing the operation specified in Equation 17 above using CIS data captured by the one or more CIS pixels and corresponding EVS data accumulated in the second integration buffer 678. Additionally, or alternatively, for one or more of the CIS pixels, the latent frame computation block 672 can compute one or more latent image frames L(t), each corresponding to a time t between time $t_s$ and time $t_{s+T}$ (representing an end of the corresponding exposure period), by performing the operation specified in Equation 15 above using corresponding latent image frames L(s). Because CIS data can be read directly into the latent frame computation block 672 at or after the end of an exposure period and because EVS data accumulated in the second integration buffer 678 is readily available and already aligned with the CIS data at this time (as discussed in greater detail below), no CIS frame buffer is required to perform on-chip deblur using the deblur circuit 670. Therefore, the deblur circuit 670 and/or the corresponding image sensor can lack a CIS frame buffer in some embodiments. In other embodiments, the deblur circuit 670 and/or the corresponding image sensor can include a CIS frame buffer, such as in embodiments in which raw CIS data can be output in addition to fused image/video data.

Figures 7, 8:
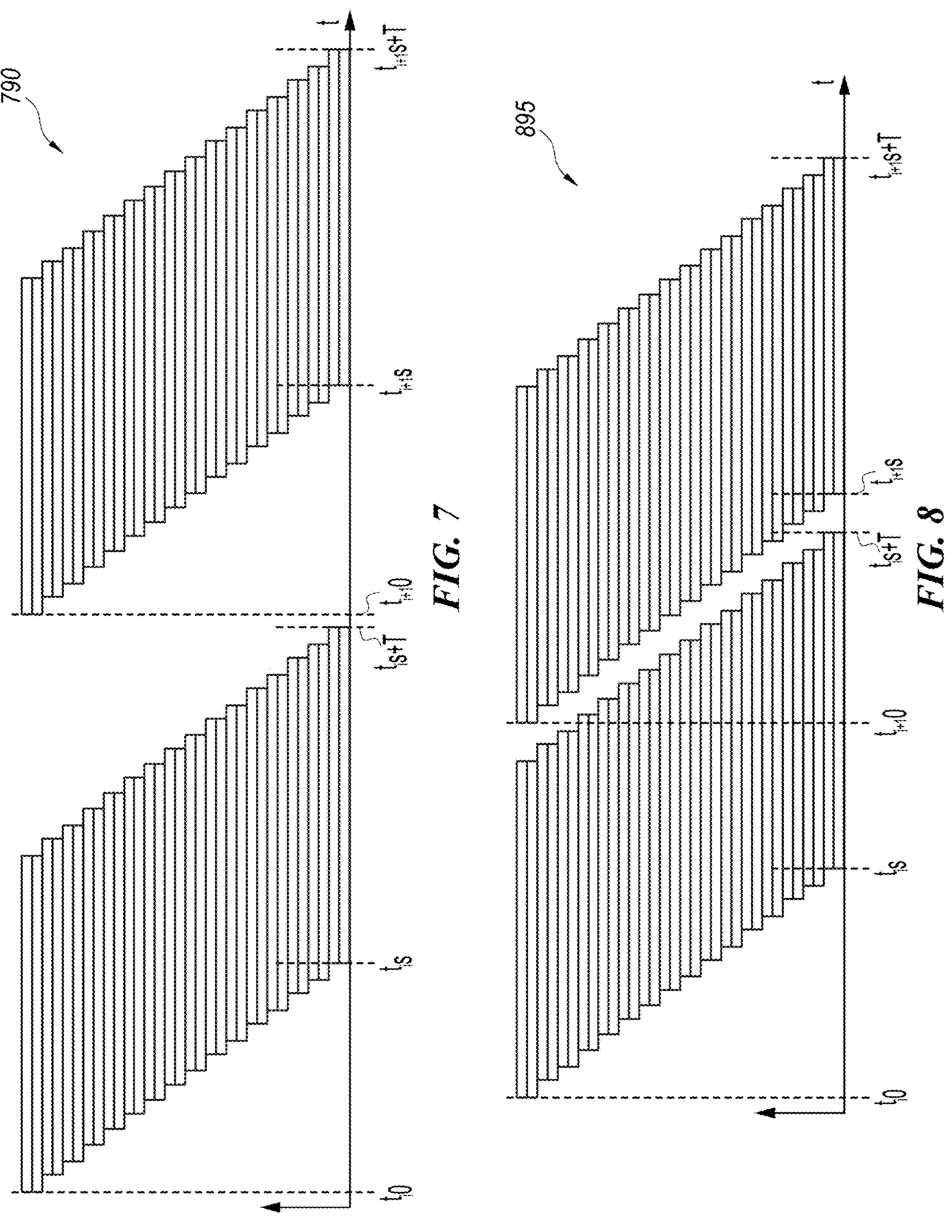
FIG. 7 is a plot illustrating immediately adjacent image frames for a CIS pixel array in accordance with various embodiments of the present technology.
FIG. 8 is a plot illustrating immediately adjacent image frames for a CIS pixel array in accordance with various other embodiments of the present technology.

As discussed above, a rolling shutter can be used to capture and read out CIS data from the CIS pixel array. For example, FIG. 7 is a plot 790 illustrating two sequential image frames (frame i and frame i+1) for a CIS pixel array in accordance with various embodiments of the present technology. CIS data corresponding to frame i and CIS data corresponding to frame i+1 are each captured using a rolling shutter. Thus, referring to frame i shown to the left of the plot 790 as an example, an exposure period for a first two rows of CIS pixels of the CIS pixel array can start at time $t_{i^o}$, and an exposure period for a last two rows of CIS pixels of the CIS pixel array can start at time $t_{i^s}$. In other words, due to use of a rolling shutter, there is a delay between when the exposure period for the first two pixels rows begins and when the exposure periods for each of the other pixels rows (including the last two pixel rows) begin. Therefore, referring to FIGS. 6 and 7 together, rolling shutter distortion can be present in latent image frames L(s) and in latent image frames L(t) computed using the EDI components of the computation block 671 for CIS pixels of pixel rows in the CIS pixel array that have exposure periods that begin at a time occurring after time $t_{i^o}$, especially when there is motion in an external scene that occurs between time $t_{i^o}$ and a start time of the corresponding exposure period. As such, in embodiments in which a rolling shutter is used, the computation block 671 of FIG. 6 can additionally include rolling shutter distortion correction components that are usable to correct latent image frames L(s) and L(t) for rolling shutter distortion.

As shown in FIG. 6, rolling shutter distortion correction components of the computation block 671 can include a counter 679 (also referred to herein as a "second counter"), an integration buffer 680 (also referred to herein as a "third integration buffer"), a product computation block 681 (also referred to herein as a "second product computation block"), and an exponential computation block 682 (also referred to herein as a "second exponential computation block"). The integration buffer 680 is also referred to herein as a rolling shutter distortion correction (RSDC) integration buffer.

The counter 679 can be an integer counter (e.g., an up/down counter) or another suitable type of counter for computing a running sum of events detected by each EVS pixel between time $t_0$ (corresponding to a start of a first exposure period for a given image frame) and time $t_s$ (representing a start of an exposure period for CIS pixels corresponding to the EVS pixel, for the given image frame).

In addition, the integration buffer 680 can be configured to store/maintain, for each EVS pixel, the running sum computed by the counter 679 between time $t_0$ and time $t_s$. More specifically, the counter 679 and the integration buffer 680 can be configured to compute, for each EVS pixel, an integral of events occurring between (i) time $t_0$ and (ii) a start of an exposure period for CIS pixels corresponding to the EVS pixel (also referred to herein as time $t_s$).

For example, consider the last two CIS pixel rows shown in frame i of the plot 790 of FIG. 7. Referring to FIGS. 6 and 7 together, when an EVS pixel corresponding to the last two CIS pixel rows detects events between time $t_{i^o}$ and time tis, corresponding event data can be read out from the EVS pixel into the computation block 671 of the deblur circuit 670. In turn, the counter 679 of the deblur circuit 670 can be enabled (e.g., via the control signal EVS_CLK or another control signal) to increment or decrement (depending on the polarities of the detected events) a running sum maintained by the integration buffer 680 for that EVS pixel. The running sum for the EVS pixel over time is equivalent to E'(t) shown in Equation 18 above, an example of which is shown in plot 218 of FIG. 2. In some embodiments, starting at time $t_{i^s}$ (corresponding to the start of the exposure period for CIS pixels of the last two rows of CIS pixels), events detected by the EVS pixel can then be accumulated by the EDI components of the computation block 671 (e.g., as opposed to the rolling shutter distortion correction components of the computation block 671).

Referring again to FIG. 6, the buffer size of the integration buffer 680 can be relatively small in some embodiments. As a specific example, assuming a readout speed of 30 frames per second, a maximum delay between a start of a first exposure period for a given frame and a start of a last exposure period for the given frame can be approximately 33 ms. Continuing with this example, assuming (a) use of a 12 megapixel CIS pixel array, (b) use of a 3 megapixel EVS pixel array, and (c) use of an EVS readout rate of approximately 50 nanosecond per row (meaning the entire EVS pixel array can be read out once every 33 ms), the counter 679 and the integration buffer 680 can be expected to accumulate up to 400 events between a start of a first exposure period for the given frame and a start of a last exposure period for the given frame. Because events have a positive or negative polarity, possible values of running sums computed by the counter 679 and the integration buffer 680 for each EVS pixel can therefore range from approximately −400 to approximately +400. As such, the integration buffer 680 can include a buffer size of approximately 10 bits/pixel in some embodiments. In these and other embodiments, a floating-point calculator can be used in lieu of the counter 679. In such embodiments, the integration buffer 680 may have a larger or smaller buffer size than 10 bits/pixel.

The product computation block 681 can multiply running sums stored in the integration buffer 680 by the contrast threshold parameter c, which is equivalent to $C_{log\text{-}TH}$ (described above with reference to Equations 6-12, 15-17, 19, and 20) and is assumed to remain constant. Thus, for each EVS pixel, the output of the product computation block 681 can be equivalent to $c\ \Sigma_{i\in[0,t]}p_i$. Thereafter, for each EVS pixel, the exponential computation block 682 can determine the exponential of the output of the product computation block 681, resulting in $\exp(c\ \Sigma_{i\in[0,t]}p_i)$. The exponential of the output of the product computation block 681 determined by the exponential computation block 682 can be output to the latent frame computation block 672 of the deblur circuit 670.

In some embodiments, computations performed by the product computation block 681 and/or the exponential computation block 682 can be performed in floating point representation, such as 9-bit mantissa and 4-bit exponent. Additionally, or alternatively, although operation of the counter 679 and/or the integration buffer 680 can be clocked by the control signal EVS_CLK or another control signal, the product computation block 681 and/or the exponential computation block 682 can be enabled to continuously perform their respective operations over time. Alternatively, operation of the product computation block 681 and/or the exponential computation block 682 can also be clocked by the control signal EVS_CLK.

As discussed above, after an exposure period for CIS pixels ends, CIS data captured by the CIS pixels can be read out into the latent frame computation block 672 of the deblur circuit 670. Per the discussion above, the latent frame computation block 672 can deblur the CIS data by combining/fusing the CIS data with accumulated EVS data stored in the second integration buffer 678 of the computation block 671. In addition, the latent frame computation block 672 can correct the CIS data for rolling shutter distortion using the corresponding output from the exponential computation block 682 of the computation block 671. More specifically, the latent frame computation block 672 can compute a latent image frame L(s) corresponding to time $t_s$ (the start of the exposure period) by performing the operation specified in Equation 17 above for each EVS pixel. Furthermore, the latent frame computation block 672 can, for each pixel, compute a latent image frame L(0) corresponding to time $t_0$ (the start of the corresponding image frame, such as the start of the first exposure period for the corresponding image frame) using (i) the latent image frame L(s), (ii) the corresponding output from the exponential computation block 682, and/or (iii) the operation specified in Equation 20 above. The latent image frame L(0) can correspond to deblurred, rolling-shutter-distortion-corrected CIS data, and can be output from the latent frame computation block 672 to an image signal processor of a corresponding imaging system.

Referring again to FIG. 7, frame i+1 does not overlap with frame i. Stated another way time $t_{i+1^o}$ (representing a start of a first exposure period for frame i+1) occurs after time $t_{i^{s+T}}$ (representing an end of a last exposure period for frame i). As long as such a relationship between immediately adjacent frames (e.g., frame i and frame i+1) is maintained, a single (e.g., only one) instance of the counter 679 and the integration buffer 680 can be used in the rolling shutter distortion correction components of the computation block 671 of the deblur circuit 670 of FIG. 6. Such a relationship, however, limits a maximum framerate usable by a corresponding image sensor.

For example, a maximum framerate usable by a corresponding image sensor can be increased by starting a first exposure period for a second frame before an end of a last exposure period for a first frame. For example, FIG. 8 is a plot 895 illustrating two immediately adjacent image frames (frame i and frame i+1). As shown, use of a rolling shutter enables time $t_{i+1^o}$ (representing a start of a first exposure period for frame i+1) to occur before time $t_{i^{s+T}}$ (representing an end of a last exposure period for frame i). Therefore, exposure periods for frame i+1 for at least some CIS pixel rows of a CIS pixel array can overlap in time with exposure periods for frame i for at least some other CIS pixel rows of the CIS pixel array. Such an arrangement requires, during a period of time extending between time $t_{i+1^o}$ and time $t_{i^{s+T}}$ shown in FIG. 8, tracking both (a) events corresponding to frame i and (b) events corresponding to frame i+1. Implementing a ping pong buffer into the rolling shutter distortion correction components of a deblur circuit can enable such functionality.

Figure 9:
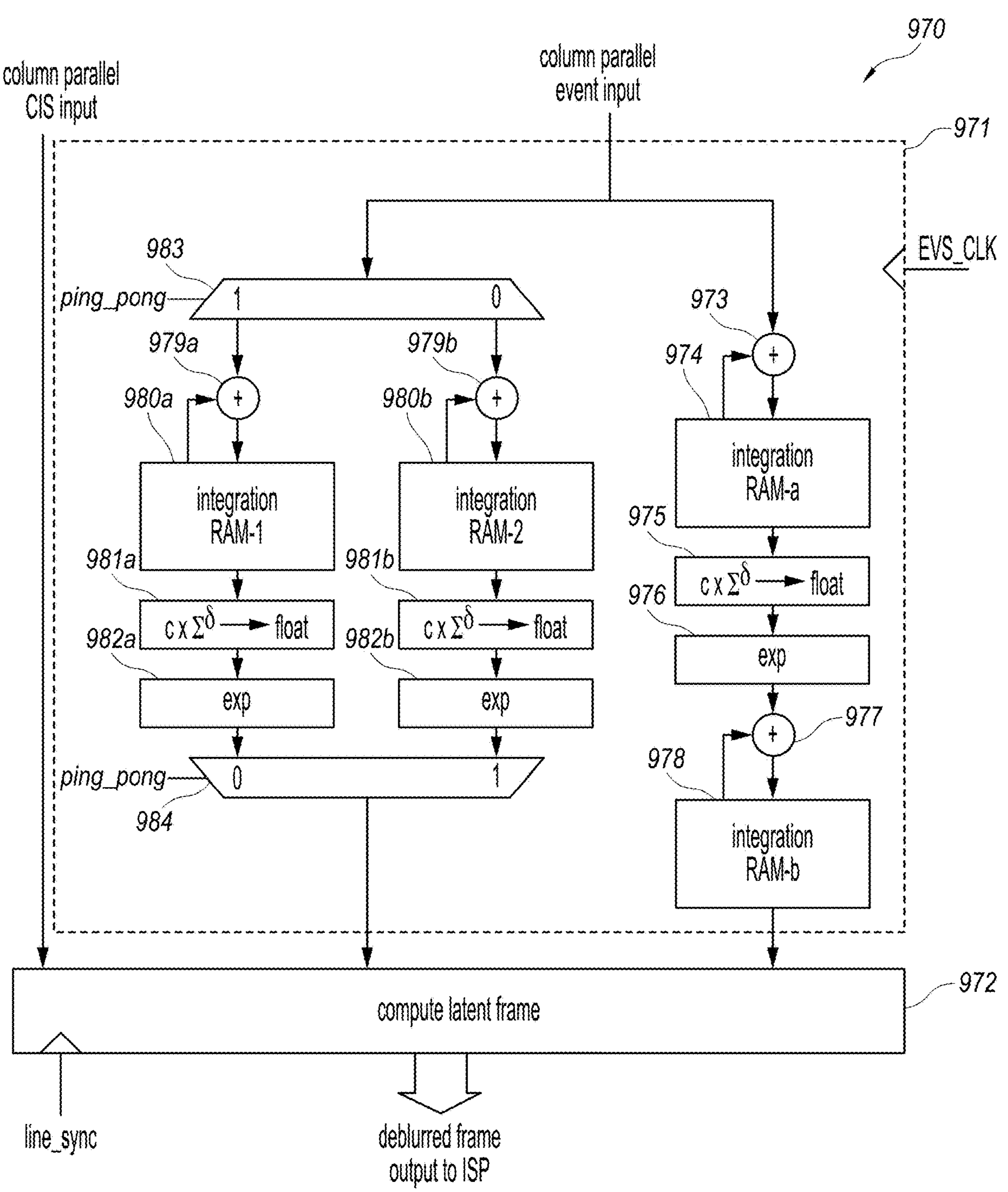
FIG. 9 is a partially schematic diagram of another deblur and rolling-shutter-distortion-correction circuit configured in accordance with various embodiments of the present technology.

For example, FIG. 9 is a partially schematic diagram of a deblur and rolling shutter distortion correction circuit 970 ("deblur circuit 970" or "the rolling shutter distortion correction circuit 970") configured in accordance with various embodiments of the present technology. The deblur circuit 970 can be an example of the deblur circuit 570 of FIG. 5, or of other deblur circuits configured in accordance with the present technology. As shown, the deblur circuit 970 is generally similar to the deblur circuit 670 of FIG. 6. Therefore, similar reference numbers are used across FIGS. 6 and 9 to denote identical or at least generally similar components, and a detailed description of the deblur circuit 970 is largely omitted here for the sake of brevity in light of the detailed description of the deblur circuit 670 provided above.

As shown in FIG. 9, the deblur circuit 970 includes a rolling shutter distortion correction and event-based double integral (EDI) computation block 971 ("computation block 971") and a latent frame computation block 972. The computation block 971 includes EDI components (e.g., a counter 973, a first integration buffer 974, a product computation block 975, an exponential computation block 976, an integration computation block 977, and a second integration buffer 978). The counter 973 is also referred to herein as a "first counter," the product computation block 975 is also referred to herein as a "first product computation block," and the exponential computation block 976 is also referred to herein as a "first exponential computation block." The first integration buffer 974 and the second integration buffer 978 are also referred to herein as "EDI integration buffers."

The computation block 971 of the deblur circuit 970 further includes rolling shutter distortion correction components. In contrast with the rolling shutter distortion correction components of the computation block 671 of the deblur circuit 670 of FIG. 6, the rolling shutter distortion correction components of the computation block 971 of the deblur circuit 970 of FIG. 9 include a ping pong buffer. More specifically, the rolling shutter distortion correction components include a routing switch 983, a counter 979*a* (also referred to herein as a "second counter"), a counter 979*b* (also referred to herein as a "third counter"), an integration buffer 980*a* (also referred to herein as a "third integration buffer"), an integration buffer 980*b* (also referred to herein as a "fourth integration buffer"), and a multiplexer 984. The integration buffer 980*a* and the integration buffer 980*b* are also referred to herein as "rolling shutter distortion correction (RSDC) integration buffers."

As shown, the rolling shutter distortion components of the computation block 971 also include a product computation block 981*a* (also referred to herein as a "second product computation block"), a product computation block 981*b* (also referred to herein as a "third product computation block"), an exponential computation block 982*a* (also referred to herein as a "second exponential computation block"), and an exponential computation block 982*b* (also referred to herein as a "third exponential computation block"). In other embodiments, the rolling shutter distortion components can include a single (e.g., only one) instance of a product computation block 981 and/or a single (e.g., only one) instance of an exponential computation block 982. In such embodiments, the product computation block 981 and the exponential computation block 982 can be positioned downstream the multiplexer 984, such as between the multiplexer 984 and the latent frame computation block 972. Continuing with this example, the product computation block 981 and the exponential computation block 982 can be configured to perform operations on running sums output from the integration buffer 980*a* or the integration buffer 980*b* via the multiplexer 984.

The counter 979*a* and the counter 979*b* of the deblur circuit 970 can be generally similar to the counter 679 of the deblur circuit 670 of FIG. 6, and the integration buffer 980*a* and the integration buffer 980*b* can be generally similar to the integration buffer 680 of the deblur circuit 670 of FIG. 6. In addition, the product computation block 981*a* and the product computation block 981*b* can be generally similar to the product computation block 681 of the deblur circuit 670 of FIG. 6, and the exponential computation block 982*a* and the exponential computation block 982*b* can be generally similar to the exponential computation block 682 of the deblur circuit 670 of FIG. 6. Thus, a detailed description of each of these rolling shutter distortion correction components of the deblur circuit 970 is omitted here for the sake of brevity in light of the detailed description of the similar components of the deblur circuit 670 provided above with reference to FIG. 6.

In the illustrated embodiment, the counter 979*a*, the integration buffer 980*a*, the product computation block 981*a*, and the exponential computation block 982*a* (collectively referred to herein as a "first set of rolling shutter distortion correction (RSDC) components") can correspond to different frames from the counter 979*b*, the integration buffer 980*b*, the product computation block 981*b*, and the exponential computation block 982*b* (collectively referred to herein as a "second set of RSDC components"). For example, referring to FIGS. 8 and 9 together, the first set of RSDC components can be used to accumulate events detected during the first frame (frame i) shown to the left in FIG. 8; and the second set of RSDC components can be used to accumulate events detected during the second frame (frame i+1) shown to the right in FIG. 8. Thereafter, the first set of RSDC components can be used to accumulate events detected during a third frame (frame i+2; not shown in FIG. 8); the second set of RSDC components can be used to accumulate events detected during a fourth frame (frame i+3; now shown in FIG. 8); and so on. Therefore, continuing with the above example, events detected by EVS pixels between time $t_{i^o}$ and a start time of a corresponding exposure period for frame i (e.g., the time tis for the bottom two pixel rows of the CIS pixel array shown in FIG. 8) can be accumulated using the first set of RSDC components. In addition, events detected by EVS pixels between time $t_{i+1^o}$ and a start time of a corresponding exposure period for frame i+1 (e.g., the time $t_{i+1^s}$ for the bottom two pixel rows of the CIS pixel array shown in FIG. 8) can be accumulated using the second set of RSDC components.

Routing of events detected by EVS pixels to the appropriate set of RSDC components can be handled via the routing switch 983. More specifically, the routing switch 983 is configured to receive a control signal ping_pong. In some embodiments, the control signal ping_pong can be provided and/or controlled by a common control block of an image sensor corresponding to the deblur circuit 970, such as the common control block 568 of the image sensor 530 of FIG. 5. Alternatively, the control signal ping_pong can be provided/controlled by another control block of an image sensor corresponding to the deblur circuit 970, such as the column control circuitry 562 and/or the column-scan readout circuitry 553 of the image sensor 530 of FIG. 5.

The control signal ping_pong can be used to control into which counter (the counter 979*a* or the counter 979*b*) an event detected by an EVS pixel is routed via the routing switch 983. For example, referring to FIGS. 8 and 9 together, between time $t_i^o$ and time $t_i^s$ shown in FIG. 8, the control signal ping_pong (FIG. 9) can be transitioned or held in a first state (e.g., an asserted state, a high state, a "1" state). As such, events detected by EVS pixels between time $t_i^o$ and a start time of a corresponding exposure period for frame i (e.g., the time tis for the bottom two pixel rows of the CIS pixel array shown in FIG. 8) can be routed to the counter 979*a* via the routing switch 983. Thereafter, between time $t_{i+1}^o$ and time $t_{i+1}^s$ shown in FIG. 8, the control signal ping_pong (FIG. 9) can be transitioned or held in a second state (e.g., a de-asserted state, a low state, a "0" state). As a result, events detected by EVS pixels between time $t_{i+1}^o$ and a start time of a corresponding exposure period for frame i+1 (e.g., the time $t_{i+1}^s$ for the bottom two pixel rows of the CIS pixel array shown in FIG. 8) can be routed to the counter 979*b* via the routing switch 983. Events detected by an EVS pixel during an exposure period for CIS pixels corresponding to that EVS pixel can be routed to the counter 973 of the EDI components of the computation block 971, consistent with the description of the EDI components of the computation block 671 of the deblur circuit 670 above with reference to FIG. 6.

Referring now to the multiplexer 984, the control signal ping_pong can be used to control which one of the inputs into the multiplexer 984 (e.g., which of the outputs of the exponential computation block 982*a* and the exponential computation block 982*b*) is output from the multiplexer 984 (e.g., to the latent frame computation block 972). In the illustrated embodiment, when the control signal ping_pong is transitioned or held in the first state, the output of the exponential computation block 982*b* can be routed to the latent frame computation block 972 via the multiplexer 984. On the other hand, when the control signal ping_pong is transitioned or held in the second state, the output of the exponential computation block 982*a* can be routed to the latent frame computation block 972 via the multiplexer 984. Thus, as detected events are routed to the counter 979*a* via the routing switch 983, the output of the exponential computation block 982*b* can be passed to the latent frame computation block 972 via the multiplexer 984. In addition, as detected events are routed to the counter 979*b* via the routing switch 983, the output of the exponential computation block 982*a* can be passed to the latent frame computation block 972 via the multiplexer 984. In this manner, the ping pong buffer enables roller shutter distortion correction of CIS data corresponding to two different frames that at least partially overlap in time.

Figure 10:
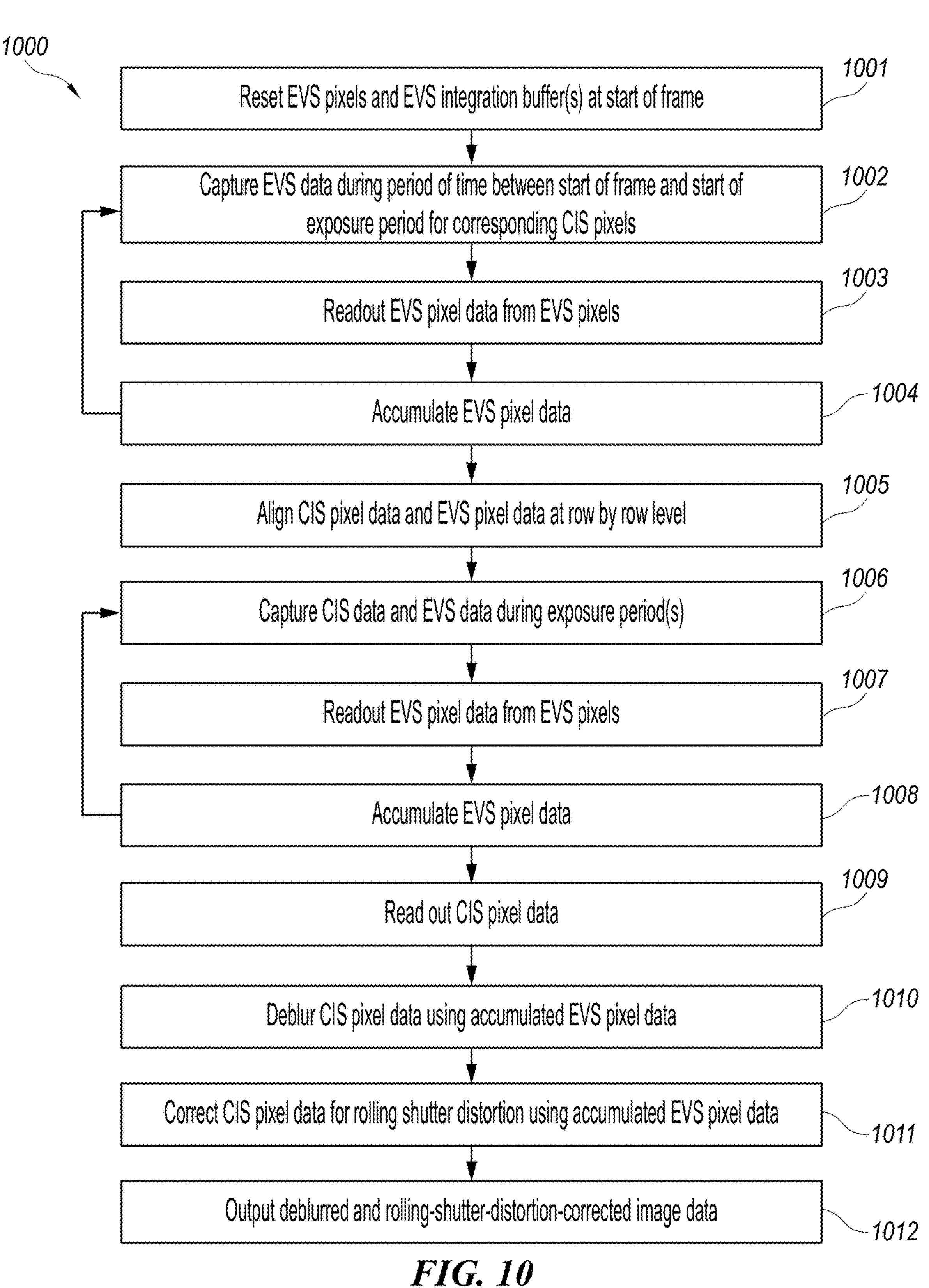
FIG. 10 is a flow diagram illustrating a method of operating an image sensor in accordance with various embodiments of the present technology.

FIG. 10 is a flow diagram illustrating a method 1000 of operating an image sensor in accordance with various embodiments of the present technology. For example, the method 1000 can be a method of performing on-chip deblurring and/or rolling shutter distortion correction of CIS data. The method 1000 is illustrated as a series of blocks 1001-1012 or steps. All or a subset of one or more of the blocks 1001-1012 can be executed by devices or components of an image sensor configured in accordance with various embodiments of the present technology. For example, all or a subset of one or more of the blocks 1001-1012 can be performed by CIS pixels of a pixel array, EVS pixels of an event driven sensing array, a common control block, row/column control circuitry, column readout circuitry, column-scan readout circuitry, and/or a deblur block or circuit. All or a subset of one or more of the blocks 1001-1012 of the method 1000 can be executed in accordance with the description of FIGS. 1-9 above and/or with the description below. Indeed, several of the blocks 1001-1012 of the method 1000 are described below with reference to FIGS. 6-13B.

The method 1000 begins at block 1001 by resetting, at a start of a frame, EVS pixels and/or integration buffer(s) of a corresponding deblur circuit. In some embodiments, resetting the EVS pixels and the integration buffer(s) can include resetting the EVS pixels and the integration buffer(s) at a same time. In some embodiments, resetting the EVS pixels and/or the integration buffers can be performed at least in part using a common control block of a corresponding image sensor. For example, the common control block can synchronize operations of a deblur block with a start of an image frame, such as by using one or more control signals.

In these and other embodiments, resetting the EVS pixels can include resetting all or a subset of the EVS pixels. As a specific example, resetting the EVS pixels at block 1001 can include resetting all of the EVS pixels at the start of a frame. As another specific example, resetting the EVS pixels at block 1001 can include resetting a subset of the EVS pixels, such as EVS pixels corresponding to CIS pixels rows having exposure periods in a last frame that have ended/elapsed.

In these and still other embodiments, resetting the integration buffer(s) can include resetting all or a subset of the integration buffers of a deblur circuit (e.g., the first integration buffer 674, the second integration buffer 678, and/or the integration buffer 680 of the deblur circuit 670 of FIG. 6; the first integration buffer 974, the second integration buffer 978, the integration buffer 980*a*, and/or the integration buffer 980*b* of the deblur circuit 970 of FIG. 9). As a specific example, resetting the integration buffer(s) can include resetting, at a start of a given frame, all of the integration buffers of a deblur circuit (e.g., the first integration buffer 674, the second integration buffer 678, and the integration buffer 680 of the deblur circuit 670 of FIG. 6; the first integration buffer 974, the second integration buffer 978, the integration buffer 980*a*, and the integration buffer 980*b* of the deblur circuit 970 of FIG. 9). As another specific example, resetting the integration buffer(s) can include resetting, at a start of a given frame, all of the integration buffers of a deblur circuit that correspond to the given frame (e.g., the first integration buffer 674, the second integration buffer 678, and the integration buffer 680 of the deblur circuit 670 of FIG. 6; the first integration buffer 974, the second integration buffer 978, and the integration buffer 980*a* or the integration buffer 980*b* of the deblur circuit 970 of FIG. 9). As still another specific example, resetting the integration buffer(s) can include resetting, at a start of a given frame, one or more RSDC integration buffers of a deblur circuit (e.g., the integration buffer 680 of the deblur circuit 670 of FIG. 6, such as without resetting the first integration buffer 674 and/or the second integration buffer 678; the integration buffer 980*a* and/or the integration buffer 980*b* of the deblur circuit 970 of FIG. 9, such as without resetting the first integration buffer 974 and/or the second integration buffer 978).

Figure 11:
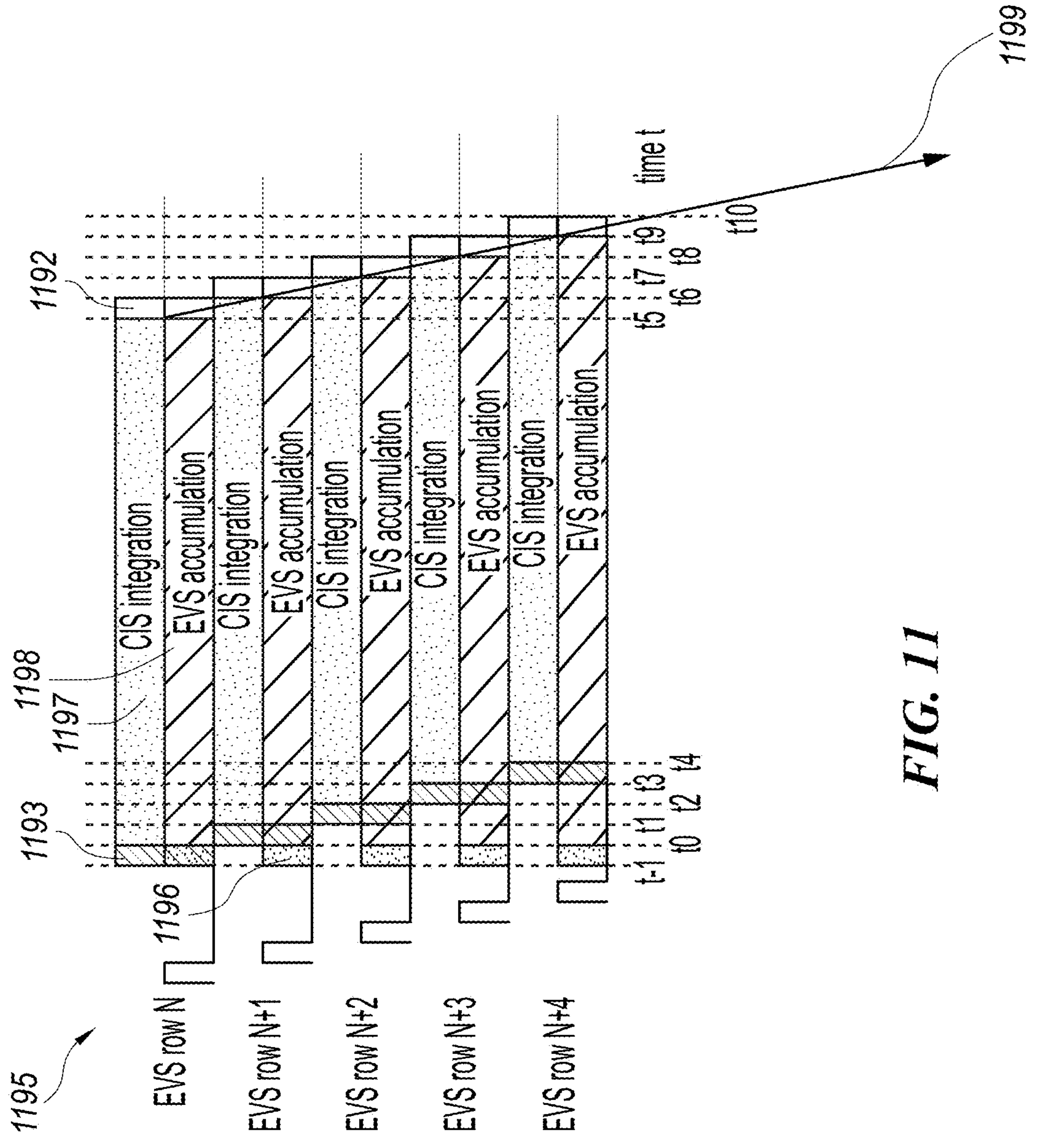
FIGS. 11 and 12 are timing diagrams corresponding to methods of operating an image sensor and/or a corresponding imaging system in accordance with various embodiments of the present technology.

FIG. 11 is a timing diagram 1195 for five EVS pixel rows (EVS row N to EVS row N+4) and five corresponding CIS pixel rows in accordance with various embodiments of the present technology. Each of the EVS pixels rows N to N+4 is illustrated directly below a corresponding one of the CIS pixels rows. FIG. 11 also illustrates (a) reset periods 1193 and 1196, (b) exposure periods 1197 for CIS pixels of the five illustrated CIS pixels rows, and (c) event accumulation periods 1198 for EVS pixels of EVS row N to EVS row N+4. Referring to FIGS. 10 and 11 together for the sake of clarity and example, at block 1001 of the method 1000, EVS pixels of all five EVS pixels rows N to N+4 and/or one or more RSDC integration buffers of a corresponding deblur circuit can be reset during reset period 1196 (FIG. 11) extending between time $t_{-1}$ and time $t_0$ (corresponding to start of the illustrated frame). In some embodiments, one or more EDI integration buffers of the corresponding deblur circuit can also be reset during the reset period 1196.

Referring again to FIG. 10, at block 1002, the method 1000 continues by, for each EVS pixel, capturing EVS data (also referred to herein as "EVS pixel data" or as "event data"). Capturing the EVS data can include detecting, using the EVS pixels, events that occur in an external scene. Referring again to FIG. 11 for the sake of example and clarity, EVS pixels of all five EVS row N to EVS row N+4 are configured to detect events during a corresponding EVS accumulation period 1198. As shown, each EVS accumulation period 1198 extends from time $t_0$ (representing a start of the illustrated frame) to an end of an exposure period 1197 for corresponding CIS pixels. Referring to EVS row N+2 as an example, an EVS accumulation period extends from time $t_0$ to time $t_7$ (corresponding to an end of an exposure period 1197 for CIS pixels corresponding to the EVS pixels of EVS row N+2). As discussed in greater detail below, events detected by EVS pixels of EVS row N+2 between time $t_0$ and time $t_2$ (corresponding to a start of the exposure period 1197 for CIS pixels corresponding to EVS pixels of EVS row N+2) can be read out from the EVS pixels at block 1003 of the method 1000 (FIG. 10) and accumulated in one or more RSDC integration buffers of a deblur circuit at block 1004 of the method 1000. In addition, events detected by EVS pixels of EVS row N+2 between time $t_2$ and time $t_7$ can be read out from the EVS pixels at block 1007 of the method 1000 and accumulated in one or more EDI integration buffers of the deblur circuit at block 1008 of the method 1000.

At block 1003, the method 1000 continues by reading out the EVS data from the EVS pixels. Block 1003 can be performed subsequent to and/or while performing block 1002. For example, when an EVS pixel detects an event, the event can be read out from the EVS pixel. When the event is read out from the EVS pixel, the EVS pixel can be reset and thereby enabled to detect subsequent events. Reading out the EVS data can include reading out the EVS data to RSDC components of a computation block of a deblur circuit. Additionally, or alternatively, reading out the EVS data can include reading out the EVS data to EDI components of a computation block of a deblur circuit. In these and other embodiments, reading out the EVS data can include reading out the EVS data using a scan readout technique, such as the scan readout technique described in greater detail below with reference to block 1007 of the method 1000.

At block 1004, the method 1000 continues by, for each EVS pixel, accumulating EVS data read out from the EVS pixel during a period of time extending between the start of the frame (e.g., time $t_0$) and the start of an exposure period (e.g., time $t_s$) for CIS pixels corresponding to that EVS pixel. Block 1004 can be performed subsequent to and/or while performing blocks 1002 and/or 1003, as is shown by the arrow returning from block 1004 to block 1002. Additionally, or alternatively, block 1004 can be performed by RSDC components of an on-chip deblur circuit.

As discussed above, accumulating EVS data for rolling shutter distortion correction can include, for each EVS pixel, computing and maintaining a running sum of events, such as using a counter and an integration buffer (e.g., the integration buffer 680 of FIG. 6; the integration buffer 980*a* and/or the integration buffer 980*b* of FIG. 9). In addition, accumulating EVS data can include, for each EVS pixel, (a) computing a product of the running sum with a contrast threshold parameter, and (b) determining the exponential of the product. The exponential of the product can be output to a latent frame computation block of a deblur circuit.

As discussed above, for each EVS pixel, EVS data captured by the EVS pixel between the start of the frame (e.g., time $t_0$) and the start of an exposure period (e.g., time $t_s$) for CIS pixels corresponding to that EVS pixel is read out from the EVS pixel and accumulated in one or more RSDC integration buffers of a deblur circuit. Referring again to FIGS. 10 and 11 together for the sake of example and clarity, at block 1004 of the method 1000, events detected by EVS pixels of EVS row N+1 between time $t_0$ and time $t_1$ (representing a start of an exposure period 1197 for CIS pixels corresponding to EVS pixels of EVS row N+1) can be accumulated in an RSDC integration buffer of a deblur circuit. Examples of an RSDC integration buffer include the integration buffer 680 of FIG. 6, the integration buffer 980*a* of FIG. 9, and the integration buffer 980*b* of FIG. 9. Furthermore, continuing with the example of FIG. 11, events detected by EVS pixels of EVS row N+2 between time $t_0$ and time $t_2$ (representing a start of an exposure period 1197 for CIS pixels corresponding to EVS pixels of EVS row N+2) can be accumulated in the RSDC integration buffer of the deblur circuit; events detected by EVS pixels of EVS row N+3 between time $t_0$ and time $t_3$ (representing a start of an exposure period 1197 for CIS pixels corresponding to EVS pixels of EVS row N+3) can be accumulated in the RSDC integration buffer of the deblur circuit; and events detected by EVS pixels of EVS row N+4 between time $t_0$ and time $t_4$ (representing a start of an exposure period 1197 for CIS pixels corresponding to EVS pixels of EVS row N+4) can be accumulated in the RSDC integration buffer of the deblur circuit. In the embodiment illustrated in FIG. 11, events detected by EVS pixels of EVS pixel row N at and after time $t_0$ occur during an exposure period 1197 for CIS pixels corresponding to the EVS pixels of EVS pixel row N. Accordingly, events detected by EVS pixels of EVS pixel row N can be accumulated in one or more EDI integration buffers of the deblur circuit in accordance with the discussion of blocks 1005-1008 of the method 1000 of FIG. 10 below (e.g., as opposed to in the RSDC integration buffer of the deblur circuit).

At block 1005, the method 1000 of FIG. 10 continues by aligning CIS pixel data with corresponding EVS pixel data for image deblur operations. In some embodiments, aligning CIS pixel data with corresponding EVS pixel data can be performed at least in part using a common control block of a corresponding image sensor. For example, the common control block can synchronize operations of row/column control circuitry and/or a deblur block of the image sensor, such as by using one or more control signals.

As discussed above with reference to FIGS. 6 and 9, EDI components of a deblur circuit can be configured to (a) integrate events to compute a running sum of events detected by an EVS pixel, (b) store the running sum in a first integration buffer (e.g., the first integration buffer 674 of FIG. 6; the first integration buffer 974 of FIG. 9), (c) integrate an exponential of a product of (i) the running sum (ii) a contrast threshold, and (d) store the results of the integration in a second integration buffer (e.g., the second integration buffer 678 of FIG. 6; the second integration buffer 978 of FIG. 9). Therefore, to ensure that the running sum stored in the first integration buffer of the EDI components of the deblur circuit and the results of the integration of the running sum stored in the second integration buffer correspond to only events detected by an EVS pixel during an exposure period for CIS pixels corresponding to the EVS pixel, EDI integration buffers (e.g., the first integration buffer 674 and the second integration buffer 678 of FIG. 6; the first integration buffer 974 and the second integration buffer 978 of FIG. 9) of the deblur circuit can be reset before a start of an exposure period for CIS pixels corresponding to the EVS pixel. In some embodiments, the first integration buffer and/or the second integration buffer can be reset at a same time as the corresponding CIS pixels.

Aligning the CIS pixel data with the corresponding EVS pixel data at block 1005 can include aligning/synchronizing (a) the timings of when EDI integration buffers of a deblur circuit are reset with (b) exposure period(s) for one or more rows of corresponding CIS pixels. In some embodiments, aligning the timings of when EDI integration buffers of a deblur circuit are reset with the exposure period(s) can include aligning the exposure period(s) with one another and/or with the accumulation of events in the EDI integration buffers such that the exposure period(s) and event accumulation in the EDI integration buffers begin at a same start time $t_s$ and/or end at a same end time $t_{s+T}$. For example, prior to the start of the exposure period(s) for CIS pixels, CIS pixels of one or more CIS pixel rows can be reset at a same time as (a) one another and/or (b) one or more EDI integration buffers. As a result, the exposure period(s) for the CIS pixels and event accumulation in the EDI integration buffers can start at the same time as one another following reset of the CIS pixels and the EDI integration buffers. In addition, assuming that the exposure period(s) and the period of time events are accumulated in the EDI integration buffers have a same duration, aligning the start times of the exposure period(s) and event accumulation in the EDI integration buffers with one another can also align their stop times.

Figure 12:
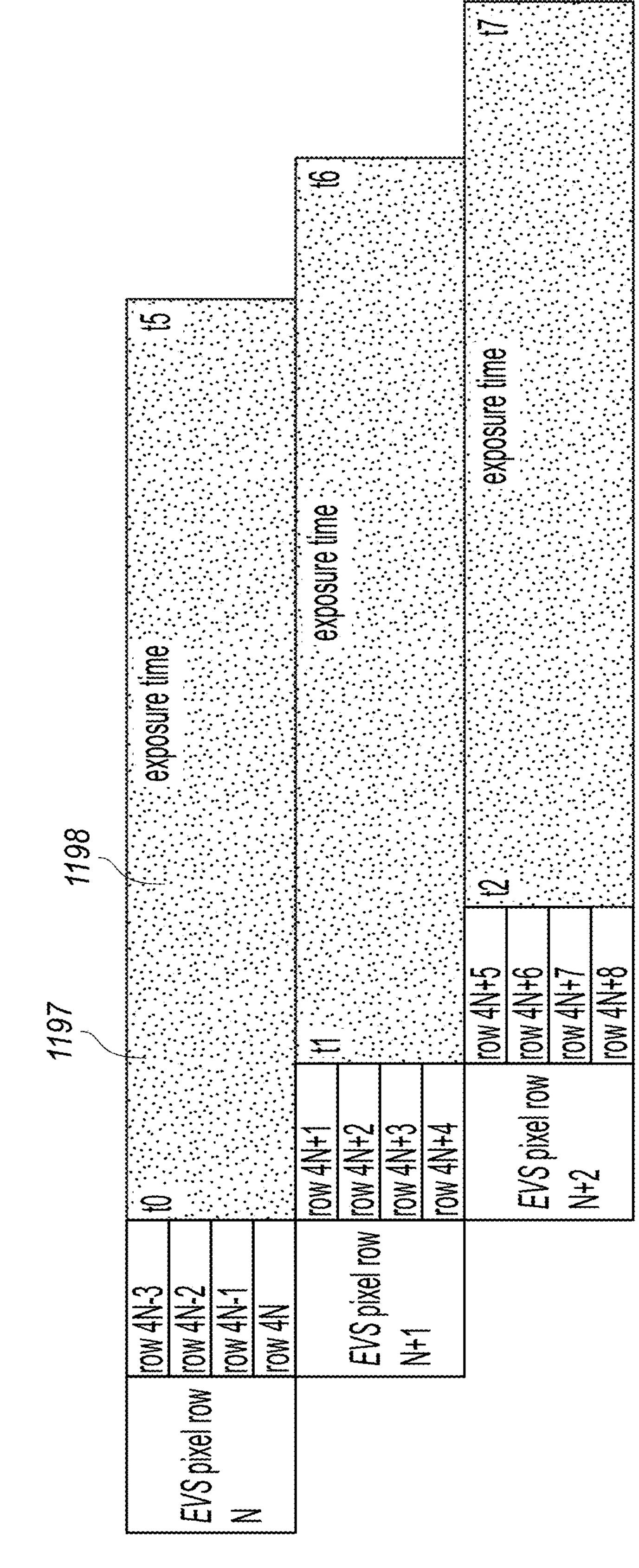

For the sake of clarity and understanding of the alignment conducted at block 1005 of the method 1000, consider FIGS. 11 and 12. FIG. 12 illustrates a timing diagram 1290 in accordance with various embodiments of the present technology. Referring to FIG. 12, the timing diagram 1290 illustrates three of the EVS pixel rows (EVS pixel rows N, N+1, and N+2) that are also illustrated in FIG. 11 and twelve CIS pixel rows (CIS pixel rows 4N−3 to 4N+8). In the illustrated embodiment, each of the EVS pixel rows N, N+1, and N+2 corresponds to four of the twelve CIS pixel rows shown. For example, EVS pixel row N corresponds to CIS pixel rows 4N, 4N−1, 4N−2, and 4N−3. In other words, EVS data captured by EVS pixel(s) of EVS pixel row N can be used for event-guided deblur and rolling shutter distortion correction of CIS data captured by CIS pixels of CIS pixel rows 4N, 4N−1, 4N−2, and 4N−3.

CIS data captured by CIS pixels of the CIS pixel rows 4N, 4N−1, 4N−2, and 4N−3 is frame-based and is synchronously read out after each corresponding exposure period ends. In many active pixel sensors, CIS data is read out row-by-row. In such configurations, different exposure period start and stop times are often used for the different rows. For example, in many active pixel sensors, CIS pixels of CIS pixel row 4N often will have a first exposure period that starts and stops at different times from a second exposure period used for CIS pixels of CIS pixel row 4N−1. This can be problematic for event-guided deblur when the CIS pixel row 4N and the CIS pixel row 4N−1 correspond to a same EVS pixel row because the misalignment between the first exposure period and the second exposure period means that the start and/or stop times for event accumulation in EDI integration buffers of a deblur circuit corresponding to EVS pixels of the EVS pixel row will be different from the start and/or stop times of the first exposure period and/or the second exposure period. As a result, EVS data captured by an EVS pixel of the EVS pixel row will be misaligned from CIS data captured by CIS pixels of CIS pixel row 4N and/or CIS pixel row 4N−1. Such misalignment can affect the accuracy and/or efficacy of event-guided deblur operations performed on the CIS data and/or may require additional memory/processing to align the CIS data with the EVS data post data capture and/or readout.

To address this concern, at block 1005 of the method 1000, the exposure periods of CIS pixels rows corresponding to a same EVS pixel row can be aligned with one another and with event accumulation in EDI integration buffers of a deblur circuit. For example, as shown in FIG. 12, the CIS pixel rows 4N, 4N−1, 4N−2, and 4N−3 all correspond to EVS pixel row N. Thus, at block 1005, the exposure periods 1197 for CIS pixel rows 4N, 4N−1, 4N−2, and 4N−3 can be aligned (a) with one another and (b) with a portion of an event accumulation period 1198 for EVS row N. The portion of an event accumulation period 1198 can correspond to a period of time in which events detected by EVS pixels of the EVS pixel row N are accumulated in EDI integration buffers of a deblur circuit (e.g., as opposed to in RSDC integration buffers of the deblur circuit). As a result, the exposure periods 1197 for CIS pixels of CIS pixel rows 4N, 4N−1, 4N−2, and 4N−3 and event accumulation in EDI integration buffers of a deblur circuit for EVS pixels of EVS row N can each start at time $t_0$. In addition, because the durations of the exposure periods 1197 and the duration of event accumulation in the EDI integration buffers are the same, alignment of the start times at time t0 can align the ends times of the exposure periods 1197 and the end time of event accumulation in the EDI integration buffers for EVS pixels of EVS row N at time t5. In this manner, EVS data captured by EVS pixels of the EVS pixel row N is aligned with CIS data captured by CIS pixels of CIS pixel rows 4N, 4N−1, 4N−2, and 4N−3.

With continuing reference to FIGS. 11 and 12, alignment between the exposure periods 1197 and event accumulation in EDI integration buffers can be achieved by resetting the CIS pixels of the CIS pixel rows 4N, 4N−1, 4N−2, and 4N−3 at a same time and/or before the start time $t_0$. For example, referring to FIG. 11, the CIS pixels of the CIS pixel rows 4N, 4N−1, 4N−2, and 4N−3 can each be reset in a reset period 1193 preceding a start time t0 of the corresponding exposure periods 1197.

In addition, to ensure that deblur computations performed by a deblur circuit on CIS data captured by CIS pixels of CIS pixel rows 4N, 4N−1, 4N−2, and 4N−3 (FIG. 12) are based on only events detected by EVS pixels of EVS row N during the exposure periods 1197 for the CIS pixel rows 4N, 4N−1, 4N−2, and 4N−3, portions of the EDI integration buffers (e.g., the first integration buffer 674 and/or the second integration buffer 678 of FIG. 6; the first integration buffer 974 and/or the second integration buffer 978 of FIG. 9) of the deblur circuit that correspond to the EVS pixels of EVS row N can be reset before the start time t0 of the exposure periods 1197, such as (i) within the reset period 1193 show in FIG. 11 between time t−1 and time t0 and/or (ii) at a same time as the CIS pixels of the CIS pixel rows 4N, 4N−1, 4N−2, and 4N−3.

The other EVS pixels rows (e.g., the EVS pixel rows N+1, N+2, N+3, N+4, etc.) and the other CIS pixel rows (e.g., 4N+1, 4N+2, . . . , 4N+8, etc.) can be operated in a similar manner. For example, CIS pixels of the CIS pixel rows 4N+5, 4N+6, 4N+7, and 4N+8 (FIG. 12) can be reset at a same time as one another and/or in a reset period 1193 before a start time $t_2$ of exposure periods 1197 for those CIS pixels. In addition, portions of the EDI integration buffers of the deblur circuit that correspond to the EVS pixels of EVS row N+2 can be reset before the start time $t_2$ of the exposure periods 1197, such as (i) within the corresponding reset period 1193 shown in FIG. 11 between time $t_1$ and time $t_2$ and/or (ii) at a same time as the CIS pixels of the CIS pixel rows 4N+5, 4N+6, 4N+7, and 4N+8.

Referring again to FIG. 10, the method 1000 can continue by at block 1006 by (a) capturing CIS data using CIS pixels during corresponding exposure periods and (b) capturing EVS data using EVS pixels. For example, referring again to FIG. 11, CIS pixels of CIS pixel rows that correspond to EVS pixel row N can integrate photogenerated charge during the exposure period 1197 that extends from start time t0 to stop time t5. Simultaneously, the EVS pixel(s) of the EVS pixel row N can asynchronously detect events during the aligned portion of the EVS accumulation period 1198 that also extends from start time t0 to stop time t5. As another example, CIS pixels of CIS pixel rows that correspond to EVS pixel row N can integrate photogenerated charge during a corresponding exposure period 1197 that extends from start time t1 and stop time t6. Simultaneously, the EVS pixel(s) of the EVS pixel row N+1 can asynchronously detect events during the aligned portion of the EVS accumulation period 1198 that also extends from start time t1 to stop time t5. The EVS pixel(s) of the EVS pixel row N+1 can also asynchronously detect events during the portion of the EVS accumulation period 1198 that extends from the start time t0 of the frame and the start time t1 of the exposure period 1197 for the CIS pixels that correspond to EVS pixel row N+1. Events detected by EVS pixel(s) of the EVS pixel row N+1 during the period of time between time t0 and time t1 can be accumulated in an RSDC integration buffer of a deblur circuit in accordance with the discussion of blocks 1001-1004 of the method 1000 of FIG. 10.

In some embodiments, EVS pixels can be selectively enabled to capture EVS data (e.g., selectively enabled to detect events) during a corresponding event accumulation period 1198. For example, referring to FIG. 11, an EVS pixel of EVS pixel row N can be enabled at (or shortly before) time t0 such that the EVS pixel is configured to detect events that occur during the event accumulation period 1198 between time t0 and time t5. Additionally, or alternatively, the EVS pixel of the EVS pixel row N can be disabled at (or shortly after) the stop time t5 of the event accumulation period 1198 and/or at other times outside of corresponding event accumulation periods. Selectively disabling the EVS pixel at (or shortly after) the stop time t5 of the corresponding event accumulation period 1198 and/or at other times outside of corresponding event accumulation periods for that EVS pixel can save power.

In other embodiments, EVS pixels can remain enabled to capture EVS data at times outside of corresponding event accumulation periods. For example, EVS pixels of EVS pixel row N in FIG. 11 can remain activated and enabled to detect events that occur after the time t5 corresponding to the end of the event accumulation period 1198, such as to detect events that occur within a time period 1192 shown in FIG. 11. Such events detected by the EVS pixels of the EVS pixel row N after the time t5 can either be (a) discarded without being accumulated by a deblur circuit of a corresponding image sensor or (b) used in other operations (e.g., video frame interpolation, rolling shutter distortion correction for CIS data of a next image frame) of the image sensor.

At block 1007 of FIG. 10, the method 1000 continues by reading out events detected by the EVS pixels of the event driven sensing array. Block 1007 can be performed while performing block 1006. For example, when an EVS pixel detects an event, the event can be read out from the EVS pixel. When an event detected by an EVS pixel is read out from the EVS pixel, the EVS pixel can be reset and thereby enabled to detect subsequent events. In these and other embodiments, reading out events detected by the EVS pixels can be generally similar to reading out events detected by the EVS pixels at block 1003 of the method 1000.

A single EVS pixel may detect hundreds of events over a single event accumulation period. In some embodiments, each of these events can be read out of the EVS pixel and/or provided to a deblur circuit of the corresponding image sensor for accumulation (e.g., in one or more RSDC integration buffers for block 1003, in one or more EDI integration buffers for block 1007). Therefore, for a single CIS frame, a relatively large amount of EVS data can be provided to the deblur circuit for accumulation and subsequent use in event-guided deblur and/or rolling shutter distortion correction of CIS data corresponding to the CIS frame.

Such a large amount of EVS data can, in some cases, complicate and/or slow down deblur and/or rolling shutter distortion corrections computations performed by the deblur circuit of the corresponding image sensor, which may not be appropriate or acceptable for certain applications. Therefore, in some embodiments, EVS data can be read out of EVS pixels using a row-by-row scan readout. More specifically, the image sensor can scan/step through the event driven sensing array row-by-row and spend a uniform amount of time reading out each EVS pixel row. In this manner, the scan readout can limit a number of EVS readouts per CIS frame, which can simplify and/or speed up deblur computations performed by the deblur circuit.

Figures 13A, 13B:
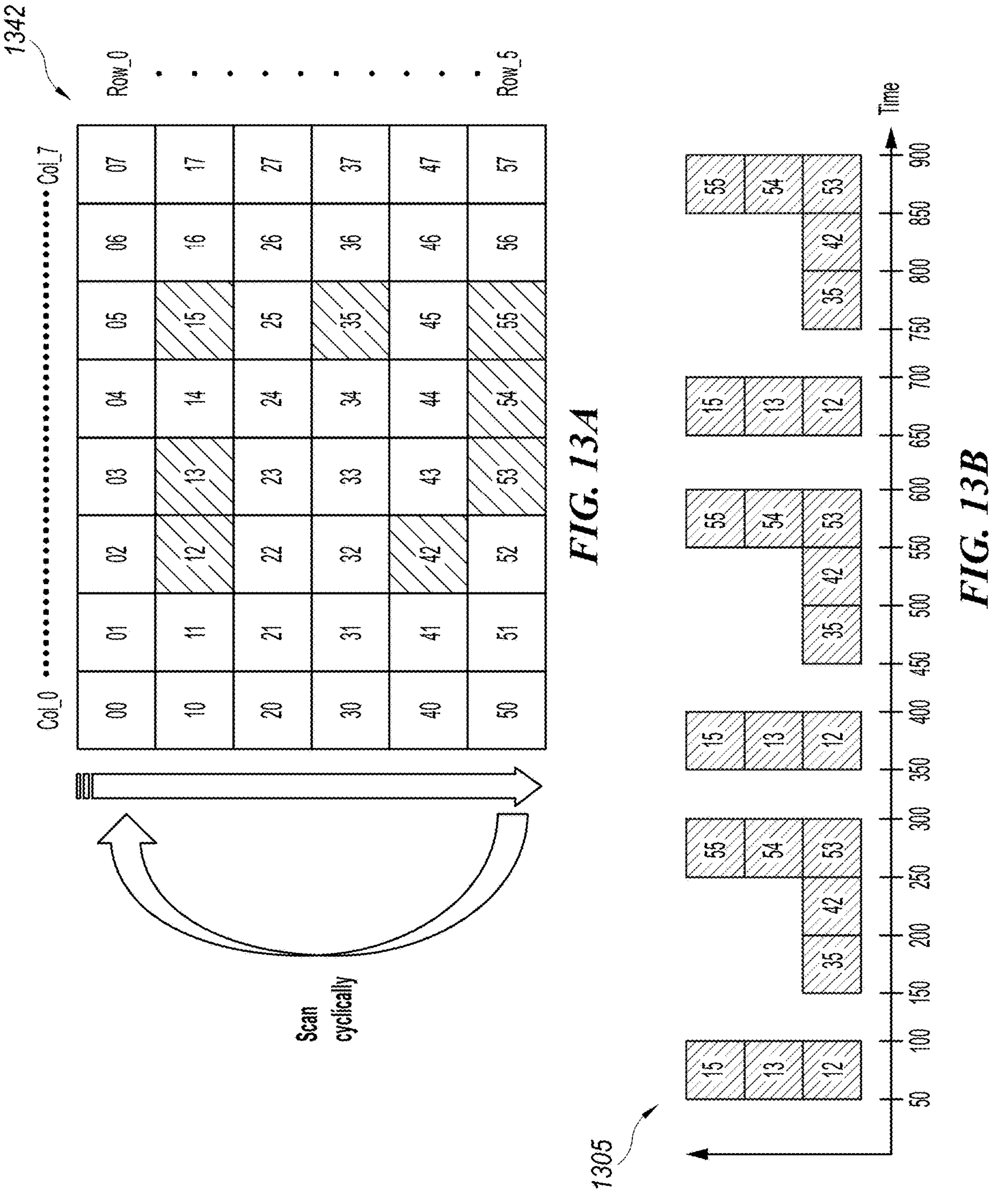
FIG. 13A is a partially schematic diagram illustrating an event driven sensing array and a row scan readout scheme configured in accordance with various embodiments of the present technology.
FIG. 13B is a plot of detected events readout from the event driven sensing array of FIG. 13A using the row scan readout scheme of FIG. 13A in accordance with various embodiments of the present technology.

For the sake of clarity and example, consider FIGS. 13A and 13B that illustrate (i) an example event driven sensing array 1342 and (ii) a corresponding plot 1305 of detected events read out from the event driven sensing array 1342 for a single CIS frame, respectively. As shown in FIG. 13A, the event driven sensing array 1342 includes a plurality of EVS pixels 00-57 arranged in a plurality of rows Row_0-Row_5 and a plurality of columns Col_0-Col_7. EVS pixels 12, 13, 35, 42, 53, 54, and 55 in the sensing array 1342 have detected events.

To read out EVS data captured by the EVS pixels 00-57 of the event driven sensing array 1342, the image sensor can scan cyclically, row-by-row, through the rows Row_0-Row_5 of the event driven sensing array 1342, spending a same amount of time at each row to read out events from EVS pixels of that row. For example, although none of the EVS pixels 00-07 of the row Row_0 have detected events, the image sensor can spend a fixed/preset amount of time (e.g., 50 ns) at Row_0 before moving on the row Row_1. Then, at row Row_1, the image sensor can spend the same fixed amount of time (e.g., 50 ns) reading out events detected by the EVS pixels 10-17. In the illustrated example, EVS pixels 12, 13, and 15 in row Row_1 have detected events. Therefore, during the fixed/preset amount of time allocated for row Row_1, the image sensor can (i) read out the events detected by EVS pixels 12, 13, and 15, and/or (ii) reset EVS pixels 12, 13, and 15 such that they are enabled to detect subsequent events. At the end of the fixed/preset amount of time allocated for row Row_1, the image sensor can move on to row Row_2 of the event driven sensing array 1342 to read out events (if any) detected by EVS pixels 20-27 of row Row_2. The plot 1305 of FIG. 13B illustrates the results of the scan readout performed on the event driven sensing array 1342 of FIG. 13A.

The row-by-row scan readout scheme described above therefore limits the total number of EVS readouts per CIS frame and keeps the time required to scan every row in the event driven sensing array constant through each scan cycle. For example, given (i) an event driven sensing array having 2,000 rows of EVS pixels and (ii) a 50 ns preset amount of time to read out each row of EVS pixels in the event driven sensing array, the scan readout can take 100 μs (2,000 EVS pixel rows×50 ns) to scan one time through the entire event driven sensing array. Thus, assuming a CIS exposure period is 32 ms in duration, the scan readout can limit the number of EVS readouts per EVS pixel to 320 (320 ms divided by 100 μs) for each CIS readout. Stated another way, each CIS frame readout can correspond to a maximum number of 320 EVS readouts per EVS pixel. This can limit the amount of EVS data fed to the deblur circuit, which can simplify computations performed by the deblur circuit and/or speed up availability of final results of such computations.

In the examples of the row-by-row scan readout described above, the image sensor spends a fixed/preset amount of time at each EVS pixel row reading out detected events (if any). As discussed above, this can keep the total time required to scan once through the entire event driven sensing array unchanged for each cycle of the scan readout. In other embodiments, the image sensor can skip EVS pixel rows in which no events have been detected. For example, referring again to FIG. 13A, none of the EVS pixels 20-27 of row Row_2 of the event driven sensing array 1342 have detected events. Thus, during scan readout, the image sensor can spend a preset amount of time (e.g., 50 ns) reading out the events detected by EVS pixels 12, 13, and 15 of row Row_1, skip over row Row_2, and then spend the next preset amount of time (e.g., 50 ns) reading out the event detected by EVS pixel 35 of row Row_3. In such embodiments, the total time spent by the scan readout cycling through the entire event driven sensing array 1342 can vary across cycles depending on which of the rows Row_0-Row_5 include EVS pixels that have detected events.

Referring again to FIG. 10, the method 1000 can continue at block 1008 by, for each EVS pixel of the event driven sensing array, accumulating EVS data read out from the EVS pixel during a corresponding event accumulation period. Block 1008 can be performed while performing blocks 1006 and/or 1007, as is shown by the arrow returning from block 1008 to block 1006. Additionally, or alternatively, block 1008 can be performed by an on-chip deblur circuit of the image sensor.

As discussed above, accumulating EVS data at block 1008 can include, for each EVS pixel, accumulating detected events in EDI integration buffers of a deblur circuit. For example, accumulating EVS data at block 1008 can include, for each EVS pixels, computing and maintaining a running sum of events, such as using a counter and a first integration buffer (e.g., of a deblur circuit of a hybrid image sensor). In addition, accumulating EVS data can include, for each EVS pixel, (a) computing a product of the running sum with a contrast threshold parameter, (b) determining the exponential of the product, and (c) integrating the exponential continuously over a corresponding EVS accumulation period. The results of the integration for each EVS pixel can be stored in a second integration buffer (e.g., of a deblur circuit of a hybrid image sensor).

As discussed above, for each EVS pixel, EVS data is accumulated over a corresponding portion of an event accumulation period. For example, for each EVS pixel, a corresponding portion of the first integration buffer and a corresponding portion of the second integration buffer can be reset prior to a start of an exposure period for CIS pixels corresponding to the EVS pixel. The reset of the corresponding portions of the first integration buffer and the second integration buffer can reset (i) a running sum stored in the corresponding portion of the first integration buffer and (ii) integration results stored in the corresponding portion of the second integration buffer. Event accumulation in the first integration buffer and the second integration buffer can then be enabled at the start of the exposure period for CIS pixels corresponding to the EVS pixel, and thereafter disabled at the end of the exposure period such that integration results stored in the corresponding portion of the second integration buffer at the end of the exposure period correspond to only events detected by the EVS pixel during the exposure period for the CIS pixel corresponding to the EVS pixel. In some embodiments, once event data has been accumulated, the raw event data can be discarded.

Referring to FIG. 11 again for the sake of clarity and example, portions of the first integration buffer(s) and the second integration buffer(s) corresponding to the EVS pixel(s) of EVS pixel row N can be reset during the reset period 1193 prior to the start time t0 of the exposure period 1197 for CIS pixels corresponding to the EVS pixel(s) of EVS pixel row N. At time t0, event accumulation in the portions of the first integration buffer(s) and the second integration buffer(s) of the deblur circuit can be enabled for the EVS pixel(s) of EVS pixel row N. As events are detected by the EVS pixel(s) during the exposure period 1197, the corresponding running count(s)/sum(s) maintained in the corresponding portions of the first integration buffer(s) is/are updated. In addition, the running sum(s) are multiplied by a contrast threshold, exponentials of the resulting products are computed, and the exponentials are integrated. The integration result(s) corresponding to the EVS pixel(s) of the EVS pixel row N are stored to the corresponding portion(s) of the second integration buffer.

At block 1009 of FIG. 10, the method 1000 continues by reading out CIS data at the end of the corresponding exposure period(s). In some embodiments, reading out the CIS data can include reading out the CIS data into the deblur circuit, such as into a latent frame computation block of the deblur circuit. In these and other embodiments, reading out the CIS data can include reading out the CIS data from CIS pixel in rows or groups of rows. For example, in embodiments in which multiple CIS pixel rows correspond to a same EVS pixel row, CIS data captured by CIS pixels of the multiple CIS pixel rows can be read out together/at the same time at or after the end of the corresponding exposure period. In some embodiments, reading out the CIS data can include skipping readout of one or more rows and/or columns of CIS pixels (e.g., to reduce resolution of the CIS data, to match a resolution of EVS data captured by EVS pixels of the event driven sensing array, and/or to reduce a mismatch between resolution of CIS data captured by CIS pixels and resolution of the EVS data captured by the EVS pixels of the event driven sensing array). In these and other embodiments, reading out the CIS data can include binning one or more rows and/or columns of CIS pixels (e.g., to reduce resolution of the CIS data, to match a resolution of EVS data captured by EVS pixels of the event driven sensing array, and/or to reduce a mismatch between resolution of CIS data captured by CIS pixels and resolution of the EVS data captured by the EVS pixels of the event driven sensing array). Additional details on (a) skipping readout of one or more rows and/or columns of CIS pixels and/or (b)

binning one or more rows and/or columns of CIS pixels during readout, are provided in the cofiled, copending, and coassigned application titled "METHODS FOR OPERATING HYBRID IMAGE SENSORS HAVING DIFFERENT CIS-TO-EVS RESOLUTIONS," which has been incorporated by reference herein in its entirety above.

Referring again to FIGS. 11 and 12 for the sake of clarity and example, CIS pixel rows 4N, 4N−1, 4N−2, and 4N−3 all correspond to the EVS pixel row N and, after alignment at block 1005 of FIG. 10, have a common exposure period 1197 that extends between time $t_0$ and time $t_5$. Thus, at or after time $t_5$, CIS data captured by CIS pixels of the CIS pixel rows 4N, 4N−1, 4N−2, and 4N−3 can be read out from the CIS pixels at the same time. This is also shown schematically via arrow 1199 in FIG. 11. Additionally, or alternatively, one or more of the CIS pixel rows 4N, 4N−1, 4N−2, and 4N−3 can be skipped or binned together during readout.

At block 1010, the method 1000 continues by deblurring the CIS data (read out from CIS pixels at block 1009) using accumulated EVS data generated and stored in a corresponding portion of the second integration buffer at block 1008. In some embodiments, deblurring the CIS data can include combining the CIS data with the accumulated EVS data to compute one or more latent image frames, such as (a) the latent image frame L(s) corresponding to a start time $t_s$ of the exposure period of the CIS pixels and/or (b) one or more other latent image frames L(t) corresponding to one or more other times t along the exposure periods of the CIS pixels. In some embodiments, combining the CIS data with the accumulated EVS data can include interpolating the EVS data to generate additional EVS data corresponding to additional rows and/or columns of EVS pixels (e.g., to increase resolution of the EVS data, to match a resolution of CIS data captured by CIS pixels of the CIS pixel array, and/or to reduce a mismatch between resolution of CIS data captured by CIS pixels and resolution of the EVS data captured by the EVS pixels of the event driven sensing array). Additional details on interpolating EVS data corresponding to additional rows and/or columns of EVS pixels are provided (a) in the cofiled, copending, and coassigned application titled "METHODS FOR OPERATING HYBRID IMAGE SENSORS HAVING DIFFERENT CIS-TO-EVS RESOLUTIONS," and (b) in the cofiled, copending, and coassigned application entitled "HYBRID IMAGE SENSORS WITH VIDEO FRAME INTERPOLATION," each of which has been incorporated by reference herein in its entirety above.

At block 1011, the method 1000 continues by correcting the CIS data for rolling shutter distortion using accumulated EVS data stored in corresponding portions of RSDC integration buffers at block 1004. More specifically, accumulated EVS data stored in an RSDC integration buffer (e.g., the integration buffer 680 of FIG. 6; the integration buffer 980*a* or the integration buffer 980*b* of FIG. 9) of a deblur circuit between a start time t0 of a frame and a start of a corresponding exposure period for the CIS pixels can be multiplied by a contrast threshold. In turn, the deblur circuit can determine an exponential of the product of the accumulated EVS data with the contrast threshold, and can output the exponential to a latent frame computation block of the deblur circuit. Thereafter, the exponential can be used to correct the CIS data (e.g., the CIS data captured by the CIS pixels at block 1006 and/or the deblurred CIS data from block 1010) for rolling shutter distortion, such as using Equation 20 above to determine a corresponding latent image frame L(0).

At block 1012, the method 1000 continues by outputting deblurred and rolling-shutter-distortion-corrected image data from the image sensor. Outputting the deblurred and rolling-shutter-distortion-corrected image data can include outputting one or more latent image frames computed at block 1011, such as in addition to or in lieu of outputting raw CIS data that is read out from the CIS pixels at block 1009 and/or raw EVS data that is generated and read out from EVS pixels at block 1007.

The timing diagram 1195 of FIG. 11 provides a visual summary of the method 1000 of FIG. 10. For example, the reset period 1196 of the timing diagram 1195 corresponds to a period of time before the start of a frame at time $t_0$. During this time, all or a subset of the EVS pixels of EVS rows N to N+4 and/or all or a subset of integration buffers (e.g., RSDC integration buffers and/or EDI integration buffers) of a deblur circuit can be reset. EVS pixels of EVS rows N to N+4 can each detect events between time t0 (corresponding to the start of the frame) and an end time of an exposure period 1197 for CIS pixels corresponding to that EVS pixel. Events detected by an EVS pixel during the period of time between time t0 and a start of the exposure period 1197 for CIS pixels corresponding to that EVS pixel can be read out and accumulated in an RSDC integration buffer of the deblur circuit. Events detected by an EVS pixel during the exposure period 1197 for CIS pixels corresponding to that EVS pixel can be read out and accumulated in one or more EDI integration buffers of the deblur circuit. Thus, corresponding portions of the one or more EDI integration buffers can be reset during a corresponding reset period 1193 leading up to a start of the exposure period. In addition, CIS pixels corresponding to the EVS pixel can be reset during the reset period 1193 such that events accumulated in the corresponding portion(s) of the EDI integration buffer(s) during the exposure period are aligned with CIS data captured by the CIS pixels during the exposure period. As shown by arrow 1199 in FIG. 11, at the end of each exposure period 1197, CIS data can be read out from the corresponding CIS pixels in rows, deblurred using EVS data accumulated in EDI integration buffers of the deblur circuit, and corrected for rolling shutter distortion using EVS data accumulated in RSDC integration buffers of the deblur circuit.

Although the blocks 1001-1012 of the method 1000 are described and illustrated in a particular order, the method 1000 of FIG. 10 is not so limited. In other embodiments, all or a subset of one or more of the blocks 1001-1012 of the method 1000 can be performed in a different order. In these and other embodiments, all or a subset of any of the blocks 1001-1012 can be performed before, during, and/or after all or a subset of any of the other blocks 1001-1012. Furthermore, a person skilled in the art will readily appreciate that the method 1000 can be altered and still remain within these and other embodiments of the present technology. For example, all or a subset of one or more of the blocks 1001-1012 can be omitted and/or repeated in some embodiments.

As another example, the method 1000 can include additional blocks in other embodiments of the present technology. As a specific example, the method 1000 can include a decision block at which the method 1000 determines whether a deblur enable signal deblurEN is asserted. In the event the method 1000 determines the deblur enable signal deblurEN is asserted, the method 1000 can proceed in a manner generally consistent with the discussion of blocks 1001-1012 described above. On the other hand, in the event the method 1000 determines the deblur enable signal deblurEN is not asserted, the method 1000 read out CIS data from CIS pixels and EVS data from EVS pixel into an image signal processor and an event signals processor, respectively, (e.g., for output from the image sensor via a synchronous communications interface), such as in lieu of reading the CIS data and the EVS data into the deblur circuit for the deblur circuit to compute deblurred and rolling-shutter-distortion-corrected image data.

Figure 14:
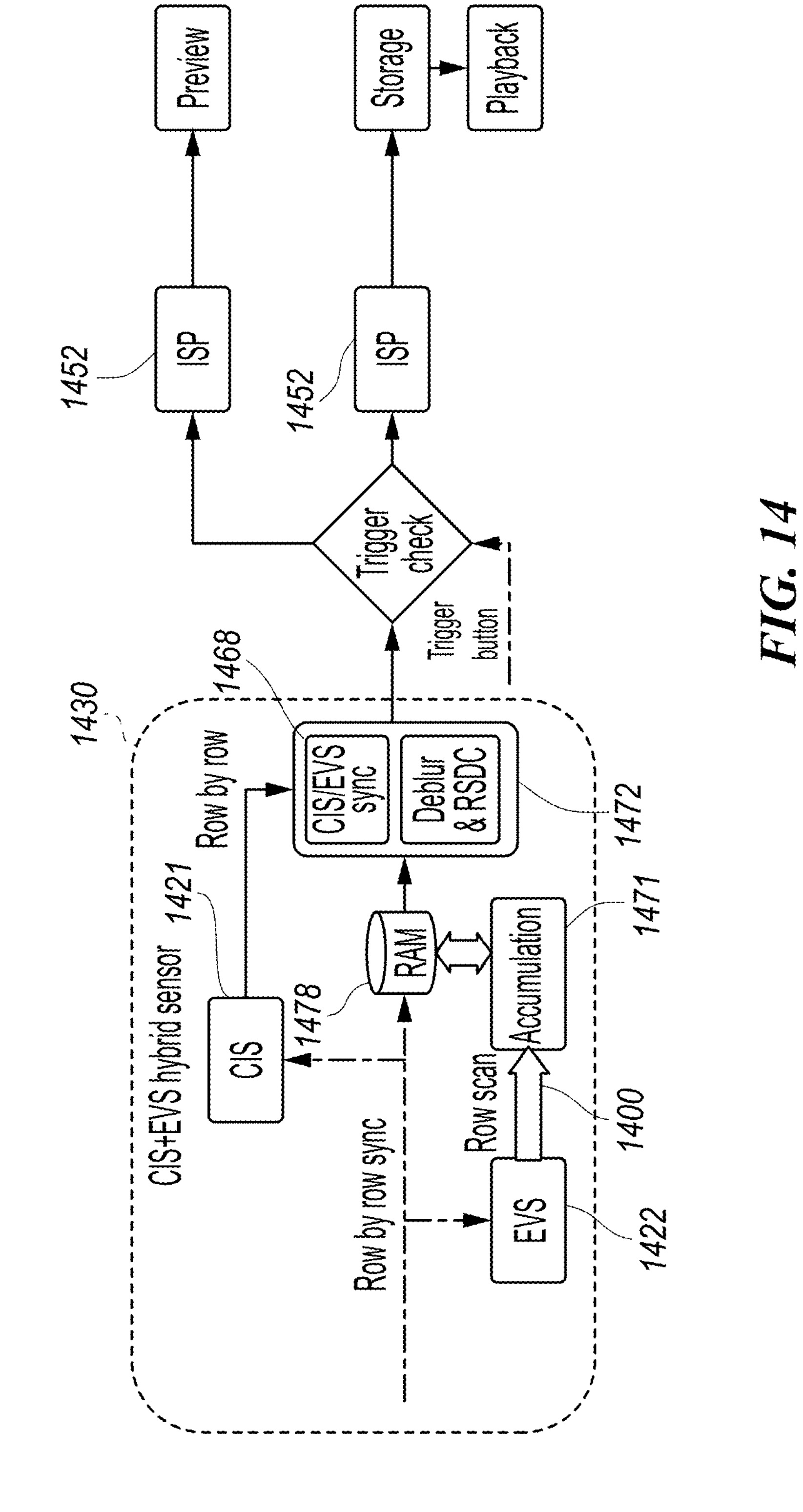
FIG. 14 is a partially schematic diagram illustrating an imaging system configured in accordance with various embodiments of the present technology.

FIG. 14 is a partially schematic diagram illustrating an imaging system 1420 configured in accordance with various embodiments of the present technology. As shown, the imaging system 1420 includes an image sensor 1430 with on-chip, event-guided deblur and rolling-shutter-distortion-correction capabilities. More specifically, CIS data 1421 and EVS data 1422 can be aligned/synced with one another and with a start of a frame, such as using a common control block 1468. Thereafter, while CIS pixels capture the CIS data 1421, EVS data 1422 can be read out from EVS pixels using a row scan readout scheme 1400 and accumulated in a computation block 1471 to generate accumulated event data. The accumulated event data can be stored in corresponding buffers 1478 (e.g., a RSDC integration buffer, a first EDI integration buffer, and/or a second EDI integration buffer). The CIS data 1421 can then be read out from the CIS pixels row-by-row or in groups of rows at the end of corresponding exposure periods, streamed into a latent frame computation block 1472, deblurred using corresponding portions of the accumulated event data stored in the buffers 1478, and corrected for rolling shutter distortion using other corresponding portions of the accumulated event data stored in the buffers 1478. Deblurred and rolling-shutter-distortion-corrected image data can then be output from the image sensor 1430, such as to one or more downstream components of the imaging system 1420.

In comparison to the imaging system 320 of FIG. 3 that performs image deblur off-chip, the imaging system 1420 of FIG. 14 offers several advantages. For example, instead of ~550 MB of buffer space, the imaging system 1420 can use roughly 12 MB-17 MB of buffer space (depending on a number of sets of RSDC components utilized in a deblur circuit) to perform image deblur and rolling shutter distortion correction. In addition, the CIS data 1421 and the EVS data 1422 need not be output from the image sensor 1430 of the imaging system 1420. Rather, the imaging system 1420 can output deblurred and rolling-shutter-distortion-corrected image data, representing a large reduction in required IO bandwidth/throughput and (as a result) power consumption in comparison to the imaging system 320. Moreover, because the imaging system 1420 can perform deblur computations on the image sensor 1430, many of the delays present in the imaging system 320 can be reduced/eliminated in the imaging system 1420, meaning that the imaging system 1420 can support real-time video in addition to processing of still images. Furthermore, because the imaging system 1420 outputs deblurred image data, the interface between the image sensor 1430 and downstream components of the imaging system 1420 is relatively simple and easy to work with, especially in comparison to the interface required by the imaging system 320.

C. Conclusion

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where context permits, singular or plural terms may also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Moreover, as used herein, the phrases "based on," "depends on," "as a result of," and "in response to" shall not be construed as a reference to a closed set of conditions. For example, an exemplary step that is described as "based on condition A" may be based on both condition A and condition B without departing from the scope of the present disclosure. In other words, as used herein, the phrase "based on" shall be construed in the same manner as the phrase "based at least in part on" or the phrase "based at least partially on." Also, the terms "connect" and "couple" are used interchangeably herein and refer to both direct and indirect connections or couplings. For example, where the context permits, element A "connected" or "coupled" to element B can refer (i) to A directly "connected" or directly "coupled" to B and/or (ii) to A indirectly "connected" or indirectly "coupled" to B.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. An image sensor, comprising:

an event driven sensing array including one or more event vision sensor (EVS) pixels, wherein each EVS pixel of the one or more EVS pixels is configured to capture event data corresponding to contrast information of light incident on the EVS pixel;

a pixel array including a plurality of CMOS image sensor (CIS) pixels arranged in one or more CIS pixel rows, wherein each CIS pixel of the plurality of CIS pixels is configured to capture CIS data corresponding to intensity of light incident on the CIS pixel;

a rolling shutter distortion correction circuit configured to generate rolling-shutter-distortion-corrected image data by correcting the CIS data captured by the plurality of CIS pixels for rolling shutter distortion using the event data captured by the one or more EVS pixels, wherein the rolling shutter distortion correction circuit includes a counter usable to compute a running sum of events detected in event data captured by an EVS pixel of the one or more EVS pixels during a period of time extending from a start of a frame to a start of an exposure period for one or more CIS pixels of the plurality of CIS pixels that correspond to the EVS pixel; and a physical interface usable to output the rolling-shutter-distortion-corrected image data from the image sensor.

2. The image sensor of claim 1, wherein the counter includes an integer counter.

3. The image sensor of claim 2, wherein the integer counter includes an up/down counter.

4. The image sensor of claim 1, wherein the counter is clocked by events in the event data captured by the EVS pixel during the period of time extending from the start of the frame to the start of the exposure period.

5. The image sensor of claim 1, wherein the rolling shutter distortion correction circuit further includes a buffer configured to store the running sum.

6. The image sensor of claim 1, wherein the rolling shutter distortion correction circuit further includes a product computation block configured to compute a product of the running sum by a contrast threshold parameter.

7. The image sensor of claim 5, wherein the rolling shutter distortion correction circuit further includes an exponential computation block configured to compute an exponential of the product.

8. The image sensor of claim 1, wherein the rolling shutter distortion correction circuit includes a ping pong buffer.

9. The image sensor of claim 8, wherein the ping pong buffer includes a routing switch, a first integration buffer having an input coupled to a first output of the routing switch, a second integration buffer having an input coupled to a second output of the routing switch, and a multiplexer having a first input coupled to an output of the first integration buffer and a second input coupled to an output of the second integration buffer.

10. The image sensor of claim 9, wherein the rolling shutter distortion correction circuit further includes a first counter coupled between the first output of the routing switch and the input of the first integration buffer, and a second counter coupled between the second output of the routing switch and the input of the second integration buffer.

11. The image sensor of claim 1, wherein the rolling shutter distortion correction circuit is a deblur and rolling shutter distortion correction circuit, and wherein the deblur and rolling shutter distortion correction circuit is further configured to generate deblurred image data by deblurring the CIS data captured by the plurality of CIS pixels using the event data captured by the one or more EVS pixels.

12. The image sensor of claim 11, wherein the counter is a second counter and the running sum is a second running sum, and wherein the deblur and rolling shutter distortion correction circuit includes (a) a first counter usable to compute a first running sum of events detected in event data captured by the EVS pixel of the one or more EVS pixels during the exposure period for the one or more CIS pixels of the plurality of CIS pixels that correspond to the EVS pixel, and (b) an integration buffer configured to store the first running sum.

13. The image sensor of claim 12, wherein the integration buffer is a first integration buffer, and wherein the deblur and rolling shutter distortion correction circuit further includes (a) a product computation block configured to compute a product of the first running sum by a contrast threshold, (b) an exponential computation block configured to compute an exponential of the product, and (c) an integration computation block configured to compute the integral of the exponential of the product over time.

14. The image sensor of claim 1, wherein the rolling shutter distortion correction circuit includes a latent frame computation block, and wherein the rolling-shutter-distortion-corrected image data includes a latent frame of the CIS data corresponding to a start of the frame.

15. An image sensor, comprising:

an event driven sensing array including one or more event vision sensor (EVS) pixels, wherein each EVS pixel of the one or more EVS pixels is configured to capture event data corresponding to contrast information of light incident on the EVS pixel;

a pixel array including a plurality of CMOS image sensor (CIS) pixels, wherein each CIS pixel of the plurality of CIS pixels is configured to capture CIS data corresponding to intensity of light incident on the CIS pixel; and a rolling shutter distortion correction circuit including— a counter usable, for each EVS pixel of the one or more EVS pixels, to compute a running sum of events detected by the EVS pixel during a period of time extending from a start of an image frame to a start of an exposure period for one or more CIS pixels of the plurality of CIS pixels that correspond to the EVS pixel, and an integration buffer configured, for each EVS pixel of the one or more EVS pixels, to store the running sum corresponding to the EVS pixel.

16. The image sensor of claim 15, wherein:

the counter is a first counter, the integration buffer is a first integration buffer, the period of time is a first period of time, the image frame is a first image frame, the exposure period is a first exposure period; and the rolling shutter distortion correction circuit further includes— a ping pong buffer having a routing switch, the first integration buffer, a second integration buffer, and a multiplexer; and a second counter usable, for each EVS pixel of the one or more EVS pixels, to compute a running sum of events detected by the EVS pixel during a second period of time extending from a start of a second image frame to a start of a second exposure period for CIS pixels of the plurality of CIS pixels that correspond to the EVS pixel.

17. The image sensor of claim 15, wherein the rolling shutter distortion correction circuit further includes— a product computation block configured to, for each EVS pixel of the one or more EVS pixels, compute a product of (i) the running sum corresponding to the EVS pixel by (ii) a contrast threshold parameter; and an exponential computation block configured to, for each EVS pixel of the one or more EVS pixels, compute an exponential of the product corresponding to the EVS pixel.

18. The image sensor of claim 15, wherein:

the rolling shutter distortion correction circuit is a deblur and rolling shutter distortion correction circuit;

the counter is a first counter and the integration buffer is a first integration buffer; and the deblur and rolling shutter distortion correction circuit further includes— a second counter usable, for each EVS pixel of the one or more EVS pixels, to compute a running sum of events detected by the EVS pixel during the exposure period for the one or more CIS pixels of the plurality of CIS pixels that correspond to the EVS pixel, a second integration buffer configured, for each EVS pixel of the one or more EVS pixels, to store the running sum corresponding to the EVS pixel that was computed by the second counter, a product computation block configured to, for each EVS pixel of the one or more EVS pixels, compute a product of (i) the running sum corresponding to the EVS pixel that was computed by the second counter by (ii) a contrast threshold parameter; and an exponential computation block configured to, for each EVS pixel of the one or more EVS pixels, compute an exponential of the product corresponding to the EVS pixel.

19. A method of operating an image sensor, the method comprising:

capturing, during an exposure period corresponding to an image frame, CMOS image sensor (CIS) data using CIS pixels of one or more CIS pixel rows of a pixel array of the image sensor, wherein the CIS data corresponds to intensity of light incident on the CIS pixels over the exposure period;

capturing, during a period of time extending between a start of the image frame and a start of the exposure period, event vision sensor (EVS) data using one or more EVS pixels of an event driven sensing array of the image sensor, wherein the EVS data includes events detected by the one or more EVS pixels during the period of time, and wherein each event represents temporal contrast of light incident on the one or more EVS pixels that exceeds a threshold; and correcting, using a rolling shutter distortion correction (RSDC) circuit of the image sensor, the CIS data for rolling shutter distortion (i) based on the EVS data and (ii) internally within the image sensor.

20. The method of claim 19, wherein the period of time is a first period of time, and wherein the method further comprises resetting the one or more EVS pixels in a second period of time immediately preceding the first period of time.

21. The method of claim 19, wherein the period of time is a first period of time, and wherein the method further comprises resetting one or more RSDC integration buffers of the RSDC circuit in a second period of time immediately preceding the first period of time such that one or more values corresponding to the one or more EVS pixels and stored in the one or more RSDC integration buffers are in a reset state at the start of the image frame.

22. The method of claim 19, further comprising computing, for each EVS pixel of the one or more EVS pixels, a running sum of events detected by the EVS pixel over the period of time.

23. The method of claim 22, further comprising computing, for each EVS pixel of the one or more EVS pixels, a product of the running sum with a contrast threshold parameter.

24. The method of claim 23, further comprising computing, for each EVS pixel of the one or more EVS pixels, an exponential of the product.

25. The method of claim 19, wherein:

the EVS data is first EVS data;

the method further comprises capturing, during the exposure period, second EVS data using the one or more EVS pixels;

the second EVS data includes events detected by the one or more EVS pixels during the exposure period; and each event in the second EVS data represents temporal contrast of light incident on the one or more EVS pixels that exceeds the threshold.

26. The method of claim 25, wherein:

the period of time is a first period of time;

the RSDC circuit is a deblur and RSDC circuit; and the method further comprises resetting one or more event double integral (EDI) integration buffers of the deblur and RSDC circuit in a second period of time during the first period of time and immediately preceding the start of the exposure period such that one or more values corresponding to the one or more EVS pixels and stored in the one or more EDI integration buffers are in a reset state at the start of the exposure period.

27. The method of claim 26, further comprising resetting the CIS pixels at a same timing as resetting the one or more EDI integration buffers.

28. The method of claim 25, further comprising:

computing, for each EVS pixel of the one or more EVS pixels, a running sum of events detected by the EVS pixel over exposure period;

computing, for each EVS pixel of the one or more EVS pixels, a product of the running sum with a contrast threshold parameter;

computing, for each EVS pixel of the one or more EVS pixels, an exponential of the product; and computing, for each EVS pixel of the one or more EVS pixels, an integral of the exponential over the exposure period.

29. The method of claim 25, wherein:

the RSDC circuit is a deblur and RSDC circuit;

the method further comprises generating deblurred image data using the deblur and RSDC circuit, wherein generating the deblurred image data includes deblurring the CIS data (i) based on the second EVS data and (ii) internally within the image sensor;

correcting the CIS data for rolling shutter distortion includes computing a latent frame included in the CIS data; and the latent frame corresponds to the intensity of light incident on the CIS pixels at the start of the image frame.

30. The method of claim 19, further comprising reading the EVS data out from the one or more EVS pixels as part of a readout operation that cyclically scans the event driven sensing array EVS-pixel-row-by-EVS-pixel-row.

31. The method of claim 30, wherein the readout operation is configured to spend a preset amount of time at each EVS pixel row of the event driven sensing array to read out corresponding EVS data.

32. The method of claim 30, wherein the readout operation is configured to (a) spend a preset amount of time at each EVS pixel row of the event driven sensing array having at least one EVS pixel storing unread EVS data, and (b) skip over EVS pixel rows in which no EVS pixel is storing unread EVS data.

33. An image sensor, comprising:

an event driven sensing array including one or more event vision sensor (EVS) pixels, wherein each EVS pixel of the one or more EVS pixels is configured to capture event data corresponding to contrast information of light incident on the EVS pixel;

a pixel array including a plurality of CMOS image sensor (CIS) pixels arranged in one or more CIS pixel rows, wherein each CIS pixel of the plurality of CIS pixels is configured to capture CIS data corresponding to intensity of light incident on the CIS pixel;

a deblur and rolling shutter distortion correction circuit configured to (i) generate deblurred image data by deblurring the CIS data captured by the plurality of CIS pixels using the event data captured by the one or more EVS pixels and (ii) generate rolling-shutter-distortion-corrected image data by correcting the CIS data captured by the plurality of CIS pixels for rolling shutter distortion using the event data captured by the one or more EVS pixels, wherein the deblur and rolling shutter distortion correction circuit includes— a counter usable to compute a running sum of events detected in event data captured by an EVS pixel of the one or more EVS pixels during an exposure period for one or more CIS pixels of the plurality of CIS pixels that correspond to the EVS pixel, and an integration buffer configured to store the running sum; and a physical interface usable to output the rolling-shutter-distortion-corrected image data from the image sensor.

34. The image sensor of claim 33, wherein the counter includes an integer counter.

35. The image sensor of claim 33, wherein the deblur and rolling shutter distortion correction circuit further includes a product computation block configured to compute a product of the running sum by a contrast threshold.

36. The image sensor of claim 35, wherein the deblur and rolling shutter distortion correction circuit further includes an exponential computation block configured to compute an exponential of the product.

37. The image sensor of claim 36, wherein the deblur and rolling shutter distortion correction circuit further includes an integration computation block configured to compute an integral of the exponential over the product over time.

38. The image sensor of claim 33, wherein the deblur and rolling shutter distortion correction circuit further includes a latent frame computation block, and wherein the deblur and rolling-shutter-distortion-corrected image data includes a latent frame of the CIS data corresponding to a start of an image frame.

39. The image sensor of claim 33, wherein the counter is a first counter, and wherein the deblur and rolling shutter distortion correction circuit further includes— a ping pong buffer;

a second counter coupled to a first output of the ping pong buffer; and a third counter coupled to a second output of the ping pong buffer different from the first output.

* * * * *